United States Patent
Iwai et al.

(10) Patent No.: US 10,407,250 B2
(45) Date of Patent: Sep. 10, 2019

(54) IMAGE PROCESSING SYSTEM, IMAGE PROCESSING APPARATUS, WORKPIECE PICKUP METHOD, AND WORKPIECE PICKUP PROGRAM

(71) Applicant: OMRON Corporation, Kyoto-shi, Kyoto (JP)

(72) Inventors: Yosuke Iwai, Kusatsu (JP); Toyoo Iida, Nagaokakyo (JP); Junji Shimamura, Takatsuki (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/787,788

(22) Filed: Oct. 19, 2017

(65) Prior Publication Data

US 2018/0194573 A1   Jul. 12, 2018

(30) Foreign Application Priority Data

Jan. 10, 2017   (JP) ................... 2017-001627

(51) Int. Cl.
 *B65G 47/32* (2006.01)
 *G06T 1/00* (2006.01)
 (Continued)

(52) U.S. Cl.
 CPC ............ *B65G 47/32* (2013.01); *B25J 9/0093* (2013.01); *B25J 9/1697* (2013.01); *B65G 15/12* (2013.01);
 (Continued)

(58) Field of Classification Search
 CPC combination set(s) only.
 See application file for complete search history.

(56) References Cited

U.S. PATENT DOCUMENTS 5,040,056 A * 8/1991 Sager ............... B25J 9/0093
                                                  348/88
5,041,907 A * 8/1991 Sager ............... B07C 5/3422
                                                  348/91
(Continued)

FOREIGN PATENT DOCUMENTS

EP   2345515 A1   7/2011
EP   2538373 A2   12/2012
(Continued)

OTHER PUBLICATIONS

Chavdar Papazov et al., Rigid 3D geometry matching for grasping of known objects in cluttered scenes, International Journal of Robotics Research, vol. 31, No. 4, Apr. 1, 2012, pp. 538-553, XP055434570, ISSN: 0278-3649, DOI:10.1177/0278364911436019.
(Continued)

*Primary Examiner* — Kyle O Logan
(74) *Attorney, Agent, or Firm* — Metrolex IP Law Group, PLLC

(57) ABSTRACT

An imaging unit has its imaging field of view containing the conveyor, and images a subject in the imaging field. The imaging unit generates a luminance image representing the subject and a range image including height information indicating a height of at least one point on the subject from the conveyor by imaging the subject. A measurement unit measures a position of each workpiece in the luminance image. An obtaining unit obtains an overlap order of the workpieces based on the height information in the range image corresponding to the position of each workpiece in the luminance image. A determination unit determines the workpiece pickup order to allow a workpiece having a highest place in the overlap order to be picked up with a higher priority than other workpieces.

12 Claims, 14 Drawing Sheets

(51) Int. Cl.
  *G06T 7/73* (2017.01)
  *G06T 7/521* (2017.01)
  *G06T 7/13* (2017.01)
  *B25J 9/00* (2006.01)
  *B25J 9/16* (2006.01)
  *B65G 15/12* (2006.01)
  *G05B 19/418* (2006.01)

(52) U.S. Cl.
  CPC ..... *G05B 19/4182* (2013.01); *G05B 19/4189* (2013.01); *G06T 1/0014* (2013.01); *G06T 7/13* (2017.01); *G06T 7/521* (2017.01); *G06T 7/75* (2017.01); *G05B 2219/39102* (2013.01); *G06T 2207/10028* (2013.01)

(56) References Cited

U.S. PATENT DOCUMENTS

| | | | | |
|---|---|---|---|---|
| 7,313,464 | B1* | 12/2007 | Perreault | B25J 9/1666 318/568.1 |
| 9,393,686 | B1 | 7/2016 | Bradski et al. | |
| 2002/0077725 | A1* | 6/2002 | Bancroft | G05B 19/4182 700/245 |
| 2006/0104788 | A1* | 5/2006 | Ban | B25J 9/1697 414/729 |
| 2010/0004778 | A1* | 1/2010 | Arimatsu | B25J 9/1697 700/214 |
| 2011/0251717 | A1* | 10/2011 | Furukawa | B25J 9/1687 700/214 |
| 2012/0323358 | A1* | 12/2012 | Izumi | G06K 9/34 700/230 |
| 2014/0121836 | A1* | 5/2014 | Ban | B25J 9/0093 700/259 |
| 2014/0316573 | A1* | 10/2014 | Iwatake | B25J 9/1694 700/258 |
| 2015/0022637 | A1* | 1/2015 | Saeki | G06T 7/0004 348/46 |
| 2015/0022638 | A1* | 1/2015 | Saeki | G06T 7/0004 348/46 |
| 2016/0075031 | A1* | 3/2016 | Gotou | B25J 9/1697 700/259 |

FOREIGN PATENT DOCUMENTS

| | | |
|---|---|---|
| JP | 2012-55995 A | 3/2012 |
| JP | 2015-174758 A | 10/2015 |

OTHER PUBLICATIONS

Gustav Wikander et al., Three dimensional object recognition for robot conveyor picking, May 26, 2009, pp. 1-34, XP055434572, Retrieved from the Internet: URL:http://liu.diva-portal.org/smash/get/diva2:219202/FULLTEXT01.pdf (retrieved on Dec. 12, 2017), ISRN:LiTH-ISY-EX-09/4211--SE.

Roland T. Chin et al., Model-based recognition in robot vision, ACM Computing Surveys, vol. 18, No. 1, Mar. 1, 1986, pp. 67-108, XP058228569, ISSN: 0360-0300, DOI: 10.1145/6462.6464, ACM, New York, NY, US.

Prasanthi Guda et al., Machine Vision Fundamentals, Handbook of Industrial Automation, Aug. 29, 2000, XP055434575, Marcel Dekker, New York.

EESR dated Dec. 20, 2017 in a counterpart European Patent application.

* cited by examiner

IMAGE PROCESSING SYSTEM, IMAGE PROCESSING APPARATUS, WORKPIECE PICKUP METHOD, AND WORKPIECE PICKUP PROGRAM

CROSS REFERENCE TO RELATED APPLICATIONS

This application claims priority from prior Japanese Patent Application No. 2017-001627 filed with the Japan Patent Office on Jan. 10, 2017, the entire contents of which are incorporated herein by reference.

FIELD

The disclosure relates to a technique for controlling a robot that picks up a workpiece transported on a conveyor.

BACKGROUND

Industrial robots that pick up workpieces transported on a conveyor have been widely used in the field of factory automation (FA). Such robots are used to, for example, pick up workpieces being transported on a conveyor and place the workpieces into containers transported on another conveyor (commonly referred to as a pick-and-place operation).

Workpieces transported on a conveyor may overlap one another. When the robot picks up a lower one of two overlapping workpieces, the upper workpiece is affected by the movement of the lower workpiece and can change its position. In this case, the robot redetermines the position of this workpiece. One method for avoiding this is to eliminate overlaps between workpieces during transportation. Japanese Unexamined Patent Application Publication No. 2015-174758 (Patent Literature 1) describes a technique for eliminating overlaps between workpieces, or specifically describes a transportation device including conveyors that can eliminate various forms of overlaps between individually packaged bags during transportation. This transportation device uses an additional mechanism for eliminating overlaps between workpieces during transportation, and thus has a complicated structure.

Techniques for picking up workpieces without eliminating overlaps between workpieces during transportation have been developed recently. One such technique described in Japanese Unexamined Patent Application Publication No. 2012-055995 (Patent Literature 2) is a multi-articulated robot for picking up workpieces that are arranged without being placed on one another. The robot picks up a lower one of workpieces without moving an upper one of the workpieces. The multi-articulated robot described in Patent Literature 2 first moves a target workpiece by a predetermined displacement in a horizontal direction, and then picks up the target workpiece.

CITATION LIST

Patent Literature

Patent Literature 1: Japanese Unexamined Patent Application Publication No. 2015-174758
Patent Literature 2: Japanese Unexamined Patent Application Publication No. 2012-055995

SUMMARY

Technical Problem

The multi-articulated robot described in Patent Literature 2 picks up, for workpieces arranged without being placed on one another, a workpiece after moving it in a horizontal direction by a predetermined displacement. However, when the multi-articulated robot moves a lower one of overlapping workpieces, the upper workpiece can be affected by the movement of the lower workpiece and can change its position. In this case, the multi-articulated robot redetermines the position of this workpiece. Techniques are thus to be developed for picking up overlapping workpieces being transported without changing the position of each workpiece.

Solution to Problem

One aspect provides an image processing system for determining a workpiece pickup order in which a plurality of overlapping workpieces being transported on a conveyor are picked up by a robot. The system includes an imaging unit arranged to have an imaging field of view containing the conveyor, and images a subject included in the imaging field of view. The imaging unit generates a luminance image representing the subject and a range image including height information indicating a height of at least one point on the subject from the conveyor by imaging the subject. The image processing system further includes a measurement unit that measures a position of each of the plurality of workpieces in the luminance image, an obtaining unit that obtains an overlap order in which the plurality of workpieces overlap one another based on the height information in the range image corresponding to the position of each of the plurality of workpieces in the luminance image, and a determination unit that determines the workpiece pickup order for the plurality of workpieces to allow a workpiece having a highest place in the overlap order to be picked up with a higher priority than other workpieces.

In some embodiments, the determination unit determines the workpiece pickup order for each workpiece to allow a workpiece having a higher place in the overlap order to be picked up earlier.

In some embodiments, when the luminance image includes a plurality of workpiece groups each including a plurality of overlapping workpieces, the obtaining unit obtains the overlap order for each workpiece group. The determination unit determines the workpiece pickup order for a workpiece having a highest place in the overlap order in each workpiece group to allow a workpiece more downstream in a transport path on the conveyor to be picked up with a higher priority.

In some embodiments, when the luminance image includes at least one workpiece that does not overlap another workpiece and includes a plurality of overlapping workpieces, the determination unit determines the workpiece pickup order for the at least one workpiece that does not overlap another workpiece and a workpiece having a highest place in the overlap order among the plurality of overlapping workpieces to allow a workpiece more downstream in a transport path on the conveyor to be picked up with a higher priority.

In some embodiments, the imaging unit includes a projector that projects, onto the plurality of workpieces transported on the conveyor, linear light that diverges in a direction orthogonal to a transportation direction of the plurality of workpieces, and a photoreceiver that successively receives reflected light of the linear light from the plurality of workpieces transported on the conveyor to generate the range image based on a position of the received reflected light upon every reception of light, and receives reflected light from the subject included in the imaging field of view to generate the luminance image.

In some embodiments, the imaging unit includes a projector that projects, onto the plurality of workpieces transported on the conveyor, linear light that diverges in a direction orthogonal to a transportation direction of the plurality of workpieces, a first photoreceiver that successively receives reflected light of the linear light from the plurality of workpieces transported on the conveyor to generate the range image based on a position of the received reflected light upon every reception of light, and a second photoreceiver that receives reflected light from the subject included in the imaging field of view to generate the luminance image.

Another aspect provides an image processing apparatus for determining a workpiece pickup order in which a plurality of overlapping workpieces being transported on a conveyor are picked up by a robot. The image processing apparatus includes an imaging unit that is arranged to have an imaging field of view containing the conveyor, and images a subject included in the imaging field of view. The imaging unit generates a luminance image representing the subject and a range image including height information indicating a height of at least one point on the subject from the conveyor by imaging the subject. The image processing apparatus further includes a measurement unit that measures a position of each of the plurality of workpieces in the luminance image, an obtaining unit that obtains an overlap order in which the plurality of workpieces overlap one another based on the height information in the range image corresponding to the position of each of the plurality of workpieces in the luminance image, and a determination unit that determines the workpiece pickup order for the plurality of workpieces to allow a workpiece having a highest place in the overlap order to be picked up with a higher priority than other workpieces.

Another aspect provides a pickup method for determining a workpiece pickup order in which a plurality of overlapping workpieces being transported on a conveyor are picked up by a robot. The pickup method includes imaging a subject included in an imaging field of view using an imaging unit arranged to have the imaging field of view containing the conveyor. The imaging includes generating a luminance image representing the subject and a range image including height information indicating a height of at least one point on the subject from the conveyor by imaging the subject. The method includes measuring a position of each of the plurality of workpieces in the luminance image, obtaining an overlap order in which the plurality of workpieces overlap one another based on the height information in the range image corresponding to the position of each of the plurality of workpieces in the luminance image, and determining the workpiece pickup order for the plurality of workpieces to allow a workpiece having a highest place in the overlap order to be picked up with a higher priority than other workpieces.

Another aspect provides a pickup program for determining a workpiece pickup order in which a plurality of overlapping workpieces being transported on a conveyor are picked up by a robot. The program enables a computer to implement imaging a subject included in an imaging field of view using an imaging unit that is arranged to have the imaging field of view containing the conveyor. The imaging includes generating a luminance image representing the subject and a range image including height information indicating a height of at least one point on the subject from the conveyor by imaging the subject. The program enables the computer to implement measuring a position of each of the plurality of workpieces in the luminance image, obtaining an overlap order in which the plurality of workpieces overlap one another based on the height information in the range image corresponding to the position of each of the plurality of workpieces in the luminance image, and determining the workpiece pickup order for the plurality of workpieces to allow a workpiece having a highest place in the overlap order to be picked up with a higher priority than other workpieces.

Advantageous Effects

The technique according to one or more aspects may allow overlapping workpieces being transported to be picked up without changing the position of each workpiece.

The above and other objects, features, aspects, and advantages of the present disclosure will be apparent from the following detailed description of the embodiments when taken in conjunction with the accompanying drawings.

DETAILED DESCRIPTION

Figure 1:
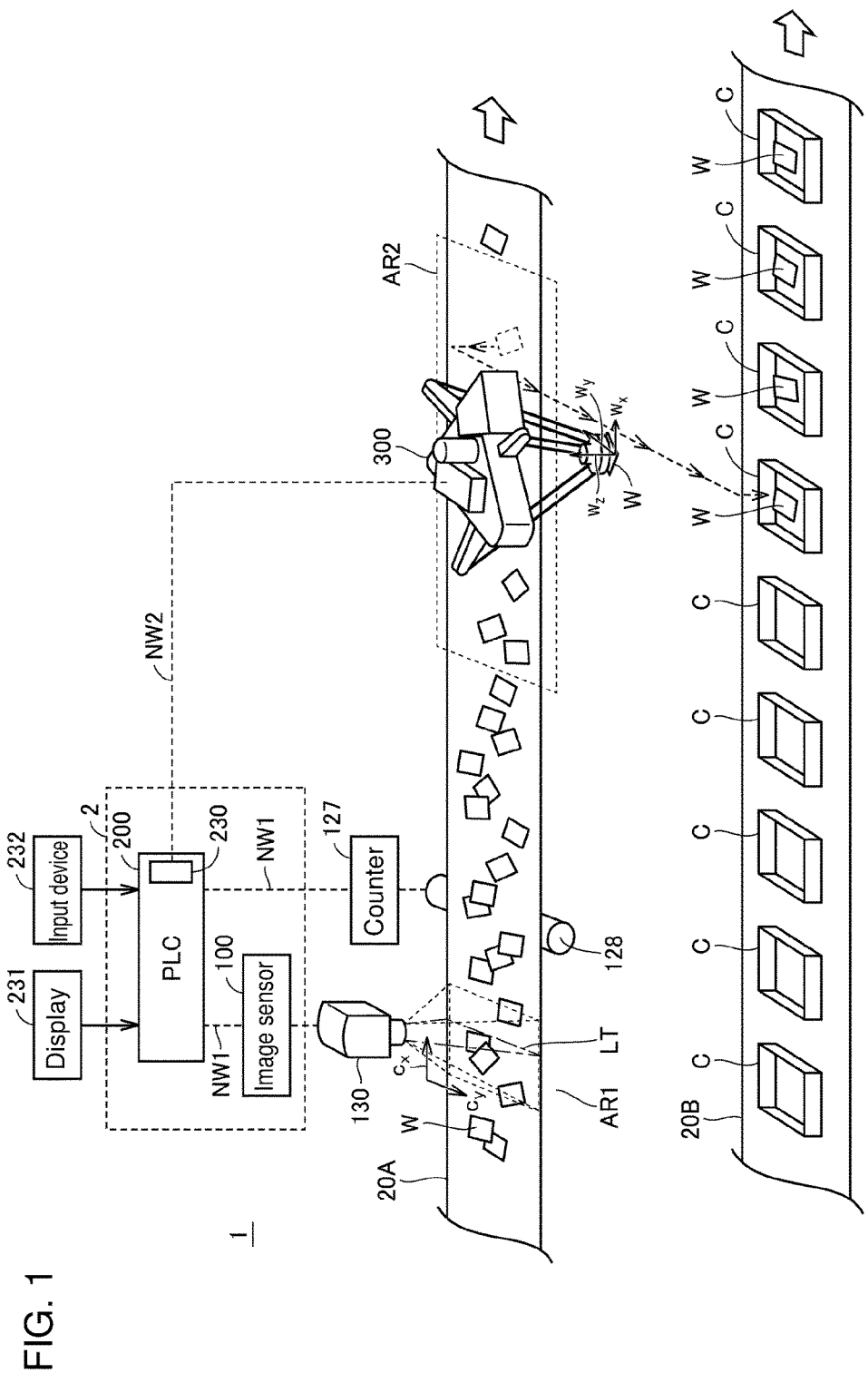
FIG. 1 is a schematic diagram illustrating the basic structure of an image processing system according to a first embodiment.

Embodiments will now be described with reference to the drawings. The same or corresponding components in the figures have the same names and functions and are given the same reference numerals, and will not be described repeatedly.

First Embodiment
A. Image Processing System 1

Referring now to FIG. 1, the basic structure of an image processing system 1 according to one or more embodiments will now be described.

As shown in FIG. 1, the image processing system 1 includes an image processing apparatus 2, an imaging device 130, and a robot 300. The image processing apparatus 2 includes an image sensor 100 and a programmable logic controller (PLC) 200.

The PLC 200 is connected to the image sensor 100, a counter 127, a servo driver 230, a display 231, an input device 232, or to other components. The image sensor 100 and the counter 127 are daisy-chain connected to the PLC 200 with field networks NW1. The field networks NW1 may be, for example, EtherCAT (registered trademark). The robot 300 is connected to the PLC 200 with a field network NW2. The field network NW2 may be, for example, EtherNET (registered trademark). The servo driver 230, the display 231, and the input device 232 are electrically connected to the PLC 200. The display 231 includes, for example, a liquid crystal panel that can display images. The input device 232 receives input operations for the image processing system 1, and typically includes a touch panel, a keyboard, and a mouse. The counter 127 is electrically connected to an encoder 128.

The counter 127 measures a displacement of the conveyor 20A using pulse waves generated by the encoder 128. More specifically, the encoder 128 generates pulse signals in accordance with the displacement of the conveyor 20A. The counter 127 receives the pulse signals from the encoder 128, and counts the number of pulses included in the pulse signals to measure the displacement of the conveyor 20A. The counter 127 transmits the count of the pulse waves to the image sensor 100 in every predetermined communication cycle.

The imaging device 130 is arranged to have an imaging field of view AR1 containing the conveyor 20A, and images subjects included in the imaging field of view AR1 in response to an imaging instruction provided from the image sensor 100. The subjects herein refer to all imaging targets included in the imaging field of view AR1. More specifically, the subjects include the conveyor 20A and workpieces W. The image sensor 100 periodically transmits an imaging instruction to the imaging device 130. For example, the image sensor 100 transmits an imaging instruction to the imaging device 130 when a difference between the count of the counter 127 at a time of output of a preceding imaging instruction and the current count exceeds a predetermined value. This allows an imaging operation for workpieces W to be performed periodically.

The image sensor 100 measures a workpiece W in a luminance image captured by the imaging device 130. For example, the image sensor 100 measures the workpiece W through image processing such as pattern matching. More specifically, the image sensor 100 prestores a model image representing the workpiece to be measured. The image sensor 100 then searches for an image area similar to the model image in the luminance image captured by the imaging device 130. When detecting an image area similar to the model image, the image sensor 100 stores the position of the detected image area. The position of the workpiece W measured by the image sensor 100 is represented using the coordinate values (cx, cy) in pixels defined in a camera coordinate system of the imaging device 130. The image sensor 100 outputs the workpiece position in the luminance image to the PLC 200.

The PLC 200 transforms the coordinate values in the camera coordinate system into the coordinate values in a world coordinate system based on the count obtained by the counter 127 in the imaging operation and using a predetermined coordinate transformation formula. The world coordinate system for controlling the robot 300 defines the position of the workpiece W using the coordinate values (wx, wy, wz) in mm. The coordinate values indicate the position of the workpiece in the imaging operation (hereafter also referred to as a reference position).

The PLC 200 tracks the workpiece W based on its reference position defined in the world coordinate system. More specifically, when receiving a current count from the counter 127, the PLC 200 calculates, based on the difference between the current count and the count obtained in the imaging operation for the workpiece W, the displacement of the workpiece W from the preceding workpiece position in the imaging operation. The displacement per count is predefined. The PLC 200 adds the calculated displacement to the reference position of the workpiece in the imaging operation to update the current position of the workpiece W. Upon receiving every new count, the PLC 200 calculates the displacement of the workpiece W from the preceding position based on the difference between the current count and the preceding count. The PLC 200 adds the displacement to the stored workpiece position to update the current position of the workpiece W. The workpiece position is updated repeatedly in this manner to track the workpiece W.

The PLC 200 determines whether the current position of the workpiece W has reached a working area AR2 for the robot 300. When determining that the current position of the workpiece W has reached the working area AR2, the PLC 200 generates an operation instruction for picking up the workpiece W in accordance with the current position of the workpiece W, and outputs the operation instruction to the servo driver 230. In response to the operation instruction received from the PLC 200, the servo driver 230 drives the robot 300 to pick up the workpiece W and places the workpiece W into a container C. The robot 300 may pick up the workpiece with any method. For example, the robot 300 may suck the workpiece W or grasp the workpiece W with its arm to perform the pickup operation.

Although the image sensor 100 and the imaging device 130 are separate devices in FIG. 1, the image sensor 100 and the imaging device 130 may be a single device.

B. Imaging Device 130

Figure 2:
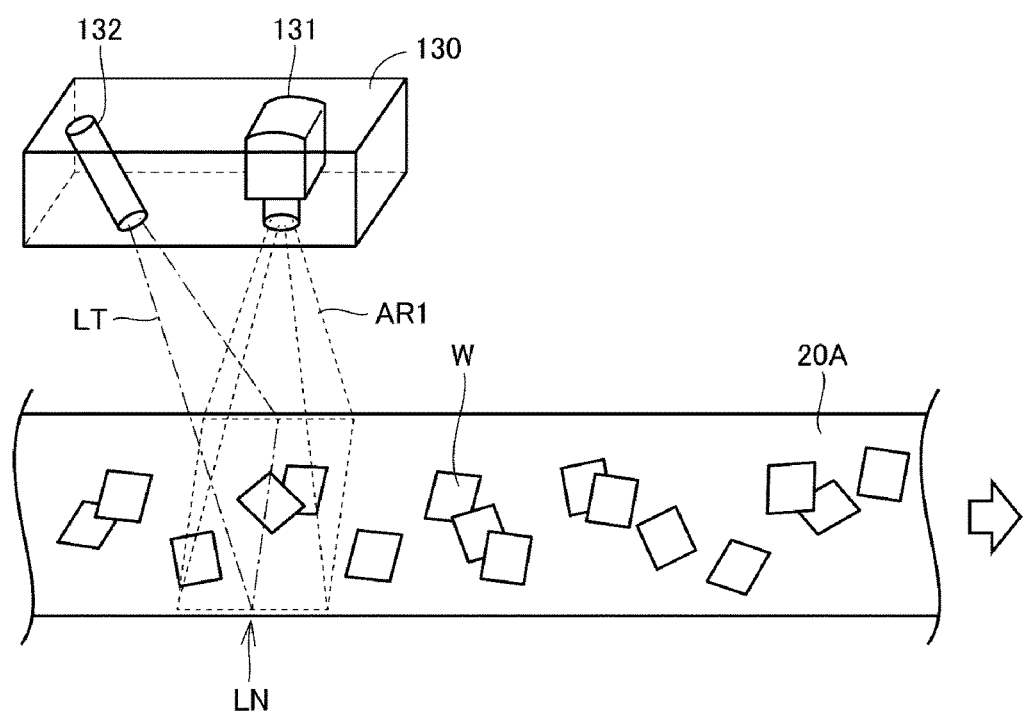
FIG. 2 is a diagram illustrating an imaging device according to a first embodiment.

The imaging device 130 will now be described with reference to FIG. 2. FIG. 2 is a diagram showing the imaging device 130 in one embodiment. In FIG. 2, workpieces W transported on the conveyor 20A are being imaged by the imaging device 130.

The imaging device 130 includes a photoreceiver 131 and a projector 132. The imaging device 130 has the imaging field of view AR1. The imaging device 130 images a subject included in the imaging field of view AR1 to generate a luminance image representing the subject. At the same time, the imaging device 130 generates a range image including height information indicating the height of each point on the subject from the transportation surface on the conveyor 20A.

In one example, the range image is generated with a light-section method. More specifically, the projector 132 projects, onto the workpiece W, linear light LT that diverges in a direction orthogonal to the transportation direction of the workpiece W. The photoreceiver 131 successively receives reflected light of the linear light LT from the workpiece W, and generates a range image based on the position of the received reflected light upon every reception of light.

The photoreceiver 131 typically includes a plurality of photoreceiving elements arranged in two dimensions. The reflected light of the linear light LT enters different photoreceiving elements depending on the distance between the imaging device 130 and the subject. More specifically, the photoreceiver 131 can obtain a profile along the line LN by imaging using the reflected light of the linear LT from the subject. The profile undergoes triangulation to produce sets of height information each indicating the height of a point on the subject on the line LN from the transportation surface on the conveyor 20A. The imaging device 130 arranges the obtained sets of height information chronologically to generate a range image.

The imaging device 130 generates a luminance image at the same time as or substantially at the same time as when generating the range image. When generating the luminance image, the imaging device 130 may stop the light LT projected from the projector 132. The photoreceiver 131 thus receives only reflected natural light from the subject, and can generate the luminance image without being affected by the light LT.

Although each pixel in the range image represents the height of a point on the subject from the conveyor in the above example, each pixel in the range image may represent the distance between a point on the subject and the imaging device 130.

C. Determining Workpiece Pickup Order

The image processing system 1 according to an embodiment obtains the overlap order of a plurality of overlapping workpieces, and determines the workpiece pickup order for each workpiece to allow a workpiece having a higher place in the overlap order to be picked up earlier. The image processing system 1 then picks up and places the workpieces in the determined pickup order.

Figure 3:
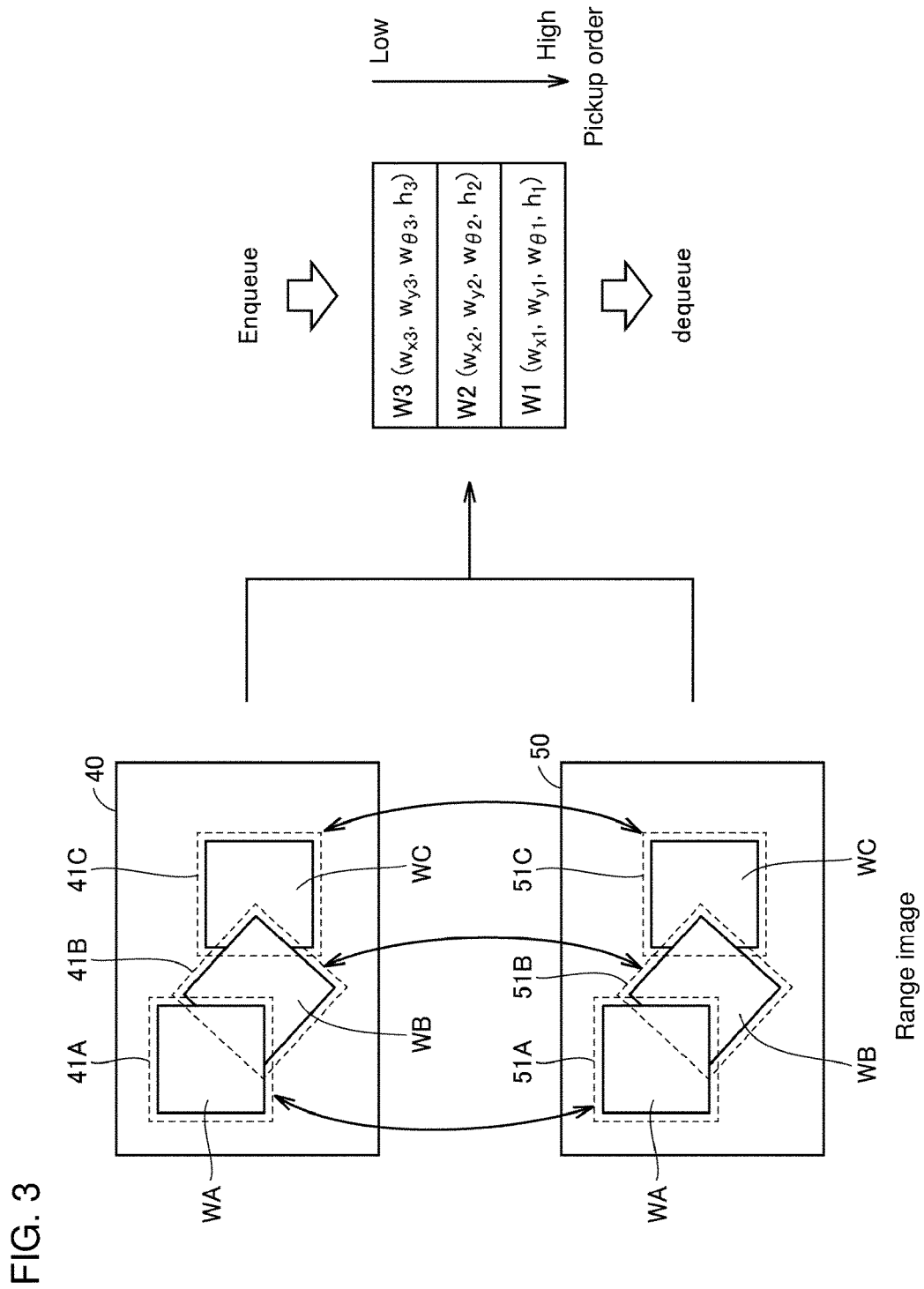
FIG. 3 is a schematic conceptual diagram illustrating a method for determining a workpiece pickup order.

Referring now to FIG. 3, a method for determining the workpiece pickup order for workpieces will be described. FIG. 3 is a schematic conceptual diagram describing the method for determining the workpiece pickup order for workpieces W.

As described above, the imaging device 130 images the subject included in the imaging field of view AR1 to generate a luminance image representing the subject and a range image including height information indicating the height of each point on the subject from the transportation surface on the conveyor 20A. FIG. 3 shows a luminance image 40 and a range image 50. In the examples shown in FIG. 3, the luminance image 40 and the range image 50 each include workpieces WA to WC overlapping one another.

The image sensor 100 measures the position of each of the workpieces WA to WC in the luminance image 40. In one example, the workpieces WA to WC undergo measurement through image processing such as pattern matching. After the image processing, the image sensor 100 measures a workpiece area 41A representing the workpiece WA, a workpiece area 41B representing the workpiece WB, and a workpiece area 41C representing the workpiece WC.

The image sensor 100 then defines the areas in the range image 50 corresponding to the workpiece areas 41A to 41C (hereafter also referred to as corresponding areas) in the luminance image 40. The luminance image 40 and the range image 50 are typically generated by the same imaging device 130, and thus are captured at the same time or substantially at the same time. The subjects in the luminance image 40 and the subjects in the range image 50 appear at the same positions between these images. The image sensor 100 thus defines a workpiece area 51A, which has the same coordinate values as the workpiece area 41A, as a corresponding area for the workpiece area 41A. Similarly, the image sensor 100 defines a workpiece area 51B as a corresponding area for the workpiece area 41B, and a workpiece area 51C as a corresponding area for the workpiece area 41C.

The image sensor 100 obtains the overlap order of the workpieces WA to WC based on height information for the workpiece areas 51A to 51C. The image sensor 100 typically determines a workpiece with a larger height in any of the workpiece areas 51A to 51C as a workpiece at a higher location overlapping other workpieces. In the example of FIG. 3, the image sensor 100 determines that the workpiece WA has the highest place in the overlap order, the workpiece WB has the second highest place, and the workpiece WC has the third highest place in the overlap order.

The image sensor 100 determines the workpiece pickup order for the workpieces WA to WC to allow the workpiece WA having the highest place in the overlap order to be picked up with a higher priority than the other workpieces WB and WC. The image sensor 100 typically determines the workpiece pickup order for each workpiece to allow a workpiece having a higher place in the overlap order to be picked up earlier. In the example of FIG. 3, the image sensor 100 determines the workpiece pickup order to allow the workpieces WA, WB, and WC to be picked up in this order.

The image sensor 100 enters (enqueues) workpiece information into a queue 225 in accordance with the determined workpiece pickup order. The workpiece information to be entered includes, for example, workpiece identification information and the workpiece position. The workpiece position is defined by, for example, the coordinate values (x-coordinate, y-coordinate) in the luminance image 40 or in the range image 50, the tilt $\theta$ of the workpiece in the luminance image 40 or in the range image 50, and the height h of the top surface of the workpiece from the conveyor.

In the example of FIG. 3, the image sensor 100 enters information for the workpiece WA having the highest place in the overlap order into the queue 225. The image sensor 100 then enters information for the workpiece WB having the second highest place in the overlap order into the queue 225. The image sensor 100 then enters information for the workpiece WC having the third overlap order into the queue 225.

The position of each workpiece entered in the queue 225 is successively updated through the tracking operation described above. When the time for picking up a workpiece arrives, the PLC 200 refers to the queue 225 and retrieves (dequeues) workpiece information entered earlier. More specifically, workpiece information entered in the queue 225 is retrieved in a first-in first-out (FIFO) manner. In the example of FIG. 3, workpiece information for the workpiece WA is retrieved. The PLC 200 generates an operation instruction for picking up the workpiece WA, and outputs the generated operation instruction to the servo driver 230. In response to the operation instruction received from the PLC 200, the servo driver 230 drives the robot 300 to pick up the designated workpiece WA and place the workpiece WA into a container C. The PLC 200 retrieves, from the queue 225, the workpiece information entered earlier every time when the workpiece pickup time arrives, and performs a pick-and-place operation for a workpiece indicated by the retrieved workpiece information.

As described above, the image sensor 100 according to an embodiment determines the workpiece pickup order for each workpiece to allow a workpiece having a higher place in the overlap order to be picked up earlier. This allows the robot 300 to pick up a workpiece at a higher location earlier. The robot 300 picks up workpieces sequentially from upper workpieces, and thus can pick up these workpieces without interference between them. The image sensor 100 does not redetermine the position of each workpiece. This allows efficient pickup of workpieces.

D. Functional Structure of Image Sensor 100

Figure 4:
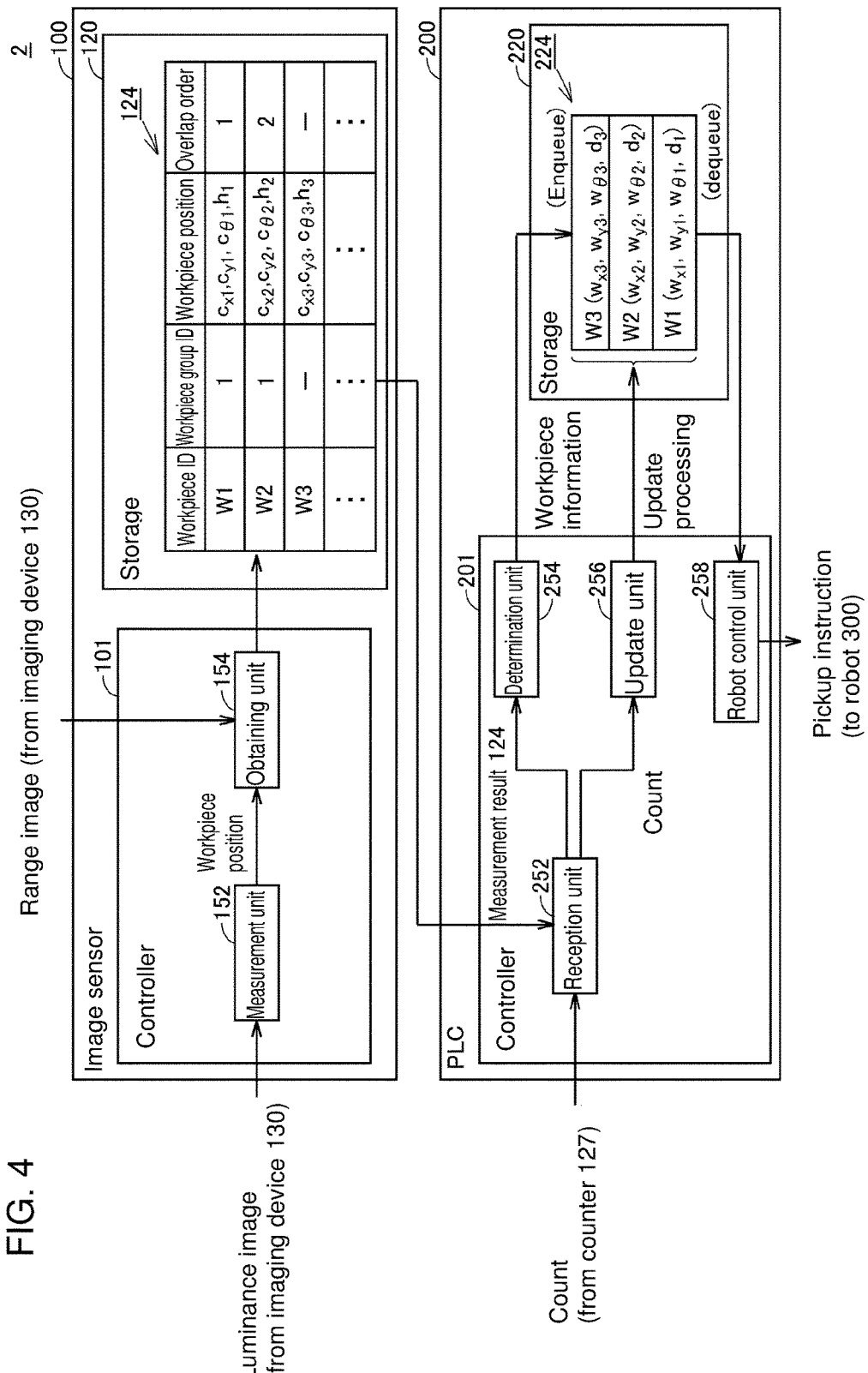
FIG. 4 is a functional block diagram illustrating an image sensor according to a first embodiment.
Figure 5:
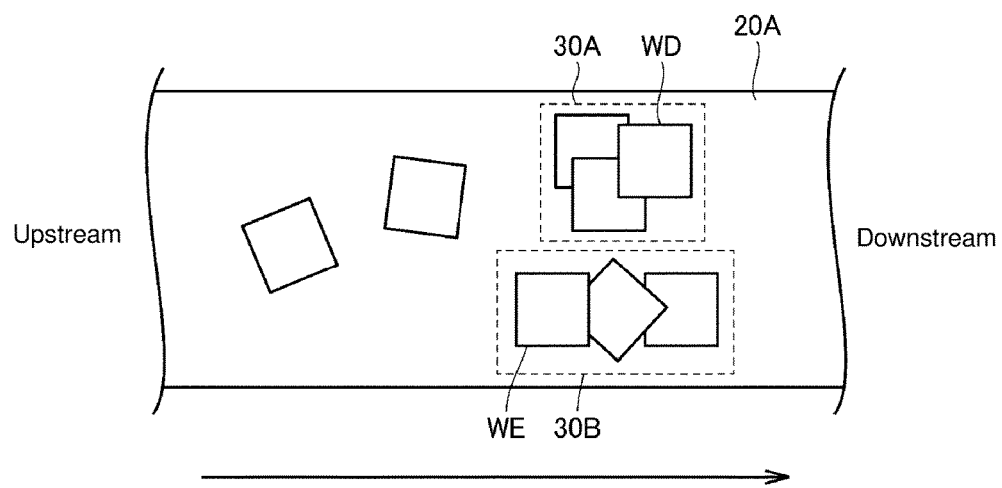
FIG. 5 is a diagram illustrating workpieces being transported on a conveyor in one example.
Figure 6:
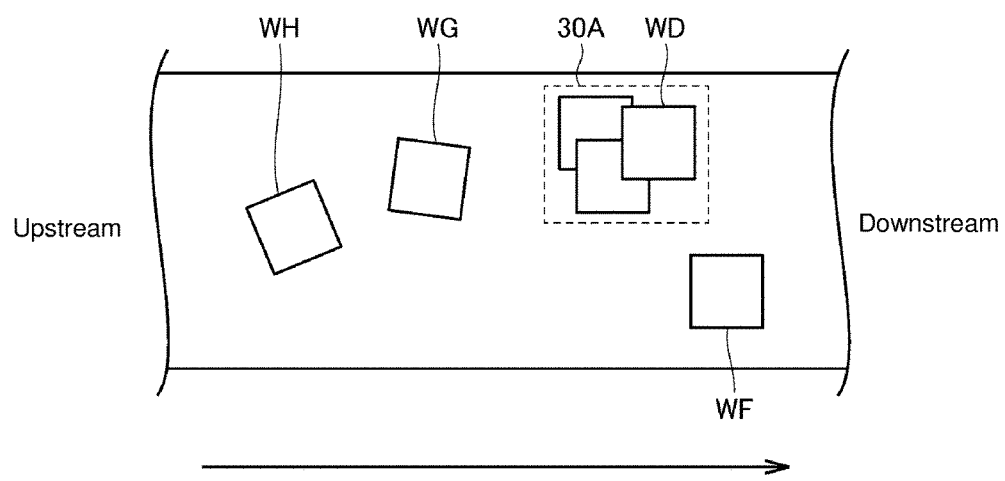
FIG. 6 is a diagram illustrating workpieces being transported on a conveyor in another example.

Referring now to FIGS. 4 to 6, the functions of the image sensor 100 will be described. FIG. 4 is a functional block diagram of the image sensor 100 in one example.

As shown in FIG. 4, the image sensor 100 includes a controller 101 and a storage 120 as its main hardware components. The controller 101 includes a measurement unit 152 and an obtaining unit 154 as its functional components. The PLC 200 includes a controller 201 and a storage 220 as its main hardware components. The controller 201 includes a reception unit 252, a determination unit 254, an update unit 256, and a robot control unit 258 as its functional components.

The measurement unit 152 periodically obtains luminance images, which are captured by imaging workpieces transported on the conveyor, from the imaging device 130. When obtaining a luminance image from the imaging device 130, the measurement unit 152 performs predetermined image processing for measuring the workpieces on the luminance image to measure the workpiece positions in the luminance image. The workpiece position may be defined by, for example, the coordinate values in the luminance image and the tilt of the workpiece in the luminance image.

The obtaining unit 154 obtains the range image, which is captured by imaging the workpieces at the same time as or substantially at the same time as when the luminance image is captured by the measurement unit 152, from the imaging device 130. As described above, each pixel in the range image represents the height of a point on the subject from the conveyor. The obtaining unit 154 defines an area in the range image corresponding to the position of each workpiece (or corresponding area) in the luminance image, and obtains the workpiece overlap order based on the height information included in the corresponding area.

When the luminance image includes a plurality of workpiece groups each including a plurality of overlapping workpieces, the obtaining unit 154 obtains the overlap order for each workpiece group. A group of workpieces herein refers to a group of overlapping workpieces. The obtaining unit 154 typically identifies a group of workpieces each having a distance between the center of gravity of each workpiece smaller than a predetermined distance as one group of workpieces. The obtaining unit 154 does not obtain the overlap order for a workpiece that does not overlap another workpiece (hereafter also referred to as an isolated workpiece). An isolated workpiece herein refers to a workpiece spaced apart from another workpiece by at least a predetermined distance.

The workpiece position measured by the measurement unit 152 and the overlap order obtained by the obtaining unit 154 are written into measurement result 124 in a manner associated with a workpiece ID for identifying each workpiece and a workpiece group ID for identifying each group of workpieces. No workpiece group ID or no overlap order is assigned to an isolated workpiece.

The reception unit 252 receives the measurement result 124 from the image sensor 100, and outputs the received measurement result 124 to the determination unit 254. The reception unit 252 also receives a count corresponding to a displacement of the conveyor from the counter 127, and outputs the received count to the update unit 256.

The determination unit 254 refers to the measurement result 124 to determine the workpiece pickup order. The determination unit 254 may determine the workpiece pickup order with any of various methods. For a plurality of groups of workpieces, for example, the determination unit 254 determines the workpiece pickup order for each group based on the position of the workpiece at the highest location in each group of workpieces. The determination unit 254 typically enters, into the queue 225, a workpiece having the highest place in the overlap order (hereafter also referred to as a highest workpiece) in each group of workpieces and more downstream in the transport path on the conveyor. This entry operation is repeated to allow each workpiece to be picked up without interference between the workpieces.

FIG. 5 is a diagram showing the workpieces being transported on the conveyor 20A in one example. In the example of FIG. 5, the determination unit 254 determines the workpiece pickup order for a highest workpiece WD in a workpiece group 30A and a highest workpiece WE in a workpiece group 30B to allow the highest workpiece WD more downstream in the transport path on the conveyor 20A to be picked up with a higher priority than the highest workpiece WE.

When the luminance image includes groups of overlapping workpieces as well as isolated workpieces that do not overlap other workpieces, the determination unit 254 enters, from the isolated workpieces and the highest workpieces in the respective workpiece groups, a workpiece more downstream in the transport path on the conveyor into the queue 225. This entry operation is repeated to allow each workpiece to be picked up without interference between the workpieces.

FIG. 6 is a diagram showing the workpieces being transported on the conveyor 20A in another example. In the example of FIG. 6, the determination unit 254 determines the workpiece pickup order for the highest workpiece WD in the workpiece group 30A and isolated workpieces WF to WH to allow the isolated workpiece WF more downstream in the transport path on the conveyor 20A to be picked up with a higher priority.

The update unit 256 sequentially updates the workpiece position information entered in the queue 225 in accordance with the latest count obtained from the counter 127 for tracking the workpieces. The tracking operation is described above, and will not be described repeatedly.

The robot control unit 258 retrieves, from the queue 225, a workpiece entered earlier every time when the workpiece pickup time arrives. The robot control unit 258 determines to pick up a workpiece retrieved from the queue 225 as a pickup target, and generates an operation instruction to pick up the workpiece. The generated operation instruction is output to the servo driver 230. In response to the operation instruction received from the PLC 200, the servo driver 230 drives the robot 300 to pick up the designated workpiece.

Some of the functional components included in the image sensor 100 (e.g., the measurement unit 152 and the obtaining unit 154) may be implemented in the PLC 200, or implemented in another information processing terminal, such as a server. Some of the functional components included in the PLC 200 (e.g., the determination unit 254 and the update unit 256) may be implemented in the image sensor 100, or implemented in another information processing terminal, such as a server.

E. Obtaining Unit 154

Figure 7:
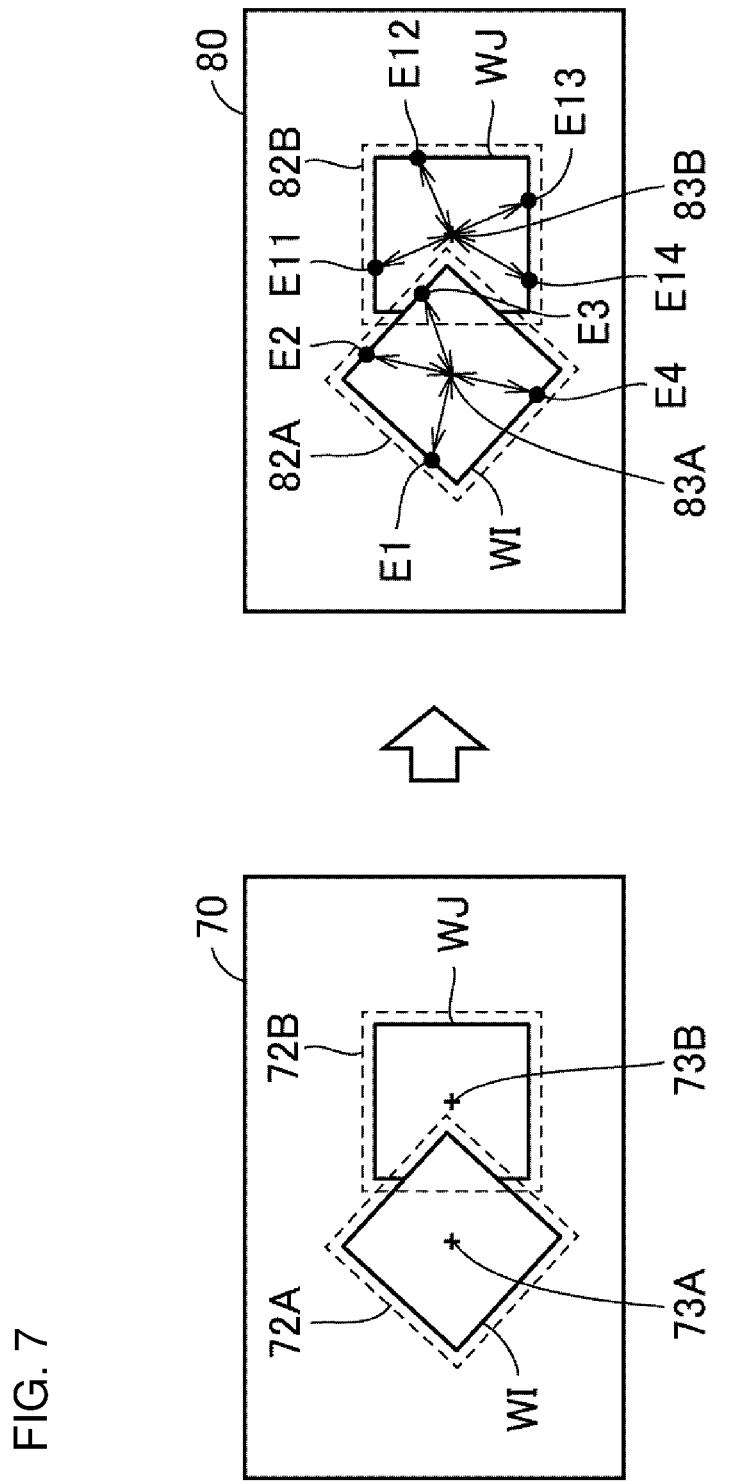
FIG. 7 is a conceptual diagram schematically illustrating the processing for obtaining a workpiece overlap order.

Referring now to FIG. 7, the processing for obtaining the workpiece overlap order performed by the obtaining unit 154 described above will be described in more detail. FIG. 7 is a conceptual diagram schematically showing the processing for obtaining the workpiece overlap order.

As described above, the obtaining unit 154 defines a corresponding area 82A in a range image 80 corresponding to a workpiece area 72A in a luminance image 70, and a corresponding area 82B in the range image 80 corresponding to a workpiece area 72B in the luminance image 70. Based on the height information included in the corresponding areas 82A and 82B, the obtaining unit 154 determines the overlap order of the workpieces WI and WJ.

The height information, which is used to obtain the workpiece overlap order, may be calculated with any of various methods. For example, the obtaining unit 154 uses a differential filter on the range image 80 to generate a differential image, and detects a point having a pixel value larger than a predetermined value as an edge in the differential image. The obtaining unit 154 selects stable edge points E1 to E4 on the detected edge points. The selected stable edge points may include, for example, a predetermined number of pixels having larger pixel values. The obtaining unit 154 then sums the height values obtained between each of the edge points E1 to E4 and the center 83A (or the center of gravity) of the workpiece WI.

As described above, the range image is generated through triangulation. However, triangulation can yield unstable distance values around the edge points E1 to E4. The obtaining unit 154 may thus exclude, from the summation, the height values falling within a predetermined percentage range (e.g., 10 to 20 percent) of the values among the height values obtained between each of the edge points E1 to E4 and the center 83A.

The obtaining unit 154 extracts stable edge points E11 to E14 on the edge of the workpiece WJ in the same manner as described above. In this process, the obtaining unit 154 selects the same number of edge points (E11 to E14) on the workpiece WJ as the number of the edge points (E1 to E4) selected on the workpiece WI. The obtaining unit 154 sums the height values obtained between each of the edge points E11 to E14 and the center 83B (or the center of gravity) of the workpiece WJ.

Using the sum values for each of the workpieces WI and WJ, the obtaining unit 154 obtains the overlap order of the workpieces WI and WJ. The obtaining unit 154 typically determines the overlap order of the workpieces WI and WJ to allow a workpiece having a higher sum value to have a higher place in the overlap order.

The height information, which is used to obtain the overlap order, may be calculated with another method. For example, the obtaining unit 154 may compare the height value at the center 83A corresponding to the center 73A of the workpiece area 72A with the height value at the center 83B corresponding to the center 73B of the workpiece area 72B to obtain the overlap order of the workpieces WI and WJ.

In some embodiments, the obtaining unit 154 may compare the height value at the center of gravity of the corresponding area 82A corresponding to the center of gravity of the workpiece area 72A with the height value at the center of gravity of the corresponding area 82B corresponding to the center of gravity of the workpiece area 72B to obtain the overlap order of the workpieces WI and WJ.

In some embodiments, the obtaining unit 154 may compare a representative value (e.g., an average, a median, a minimum, or a maximum) of the height values in the corresponding area 82A corresponding to the workpiece area 72A with a representative value (e.g., an average, a median, a minimum, or a maximum) of the height values in the corresponding area 82B corresponding to the workpiece area 72B to obtain the overlap order of the workpieces WI and WJ. The representative values may be calculated using the height values of portions of the corresponding areas 82A and 82B that do not overlap each other in the workpieces.

The obtaining unit 154 may also obtain the overlap order of the workpieces WI and WJ based on the surface areas of the portions of the corresponding areas 82A and 82B having height values falling within a predetermined range.

Although each pixel in the range image represents the height of a point on the subject from the conveyor in the example described above, each pixel in the range image may represent the distance between a point on the subject and the imaging device 130. In the latter case, the relationship between a large value and a small value of each pixel in the range image is reversed. The obtaining unit 154 identifies a workpiece having a smaller value of the distance information in a workpiece portion of the range image as a workpiece at a higher location among the overlapping workpieces.

F. Data Interactions

Figure 8:
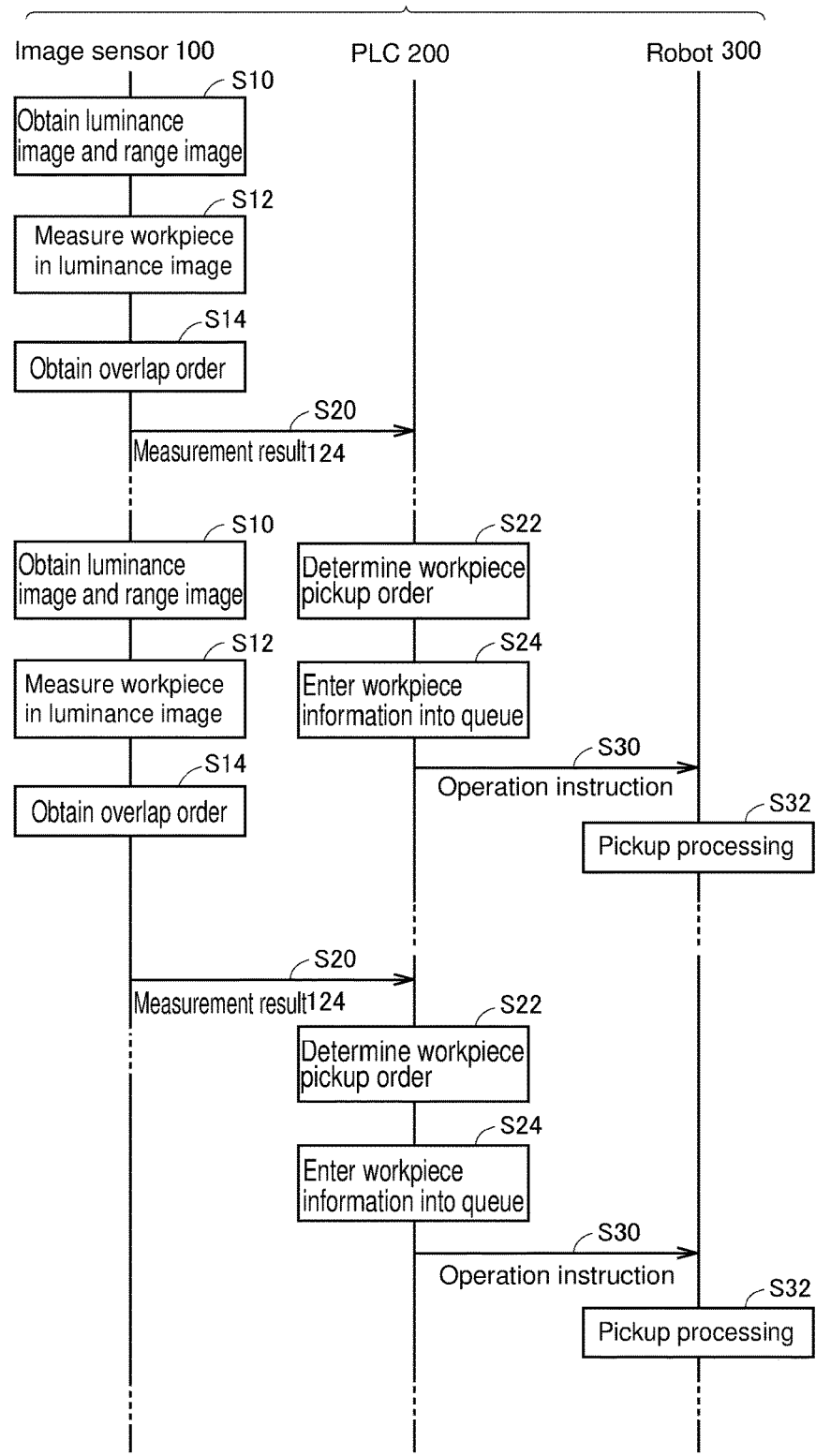
FIG. 8 is a sequence diagram illustrating data interactions between an image sensor, a programmable logic controller (PLC), and a robot.

Referring now to FIG. 8, the data interactions in the image processing system 1 will be described. FIG. 8 is a sequence diagram showing data interactions between the image sensor 100, the PLC 200, and the robot 300.

In step S10, the time for the imaging device 130 to perform imaging arrives. The imaging time arrives periodically. When the imaging time has arrived, the image sensor 100 outputs an imaging instruction to the imaging device 130. In response to the instruction, the imaging device 130 performs an imaging operation to generate a luminance image representing a subject and a range image including height information indicating the height of each point on the subject from the conveyor. The image sensor 100 obtains the generated luminance image and the range image from the imaging device 130.

In step S12, the image sensor 100 performs predetermined image processing for measuring workpieces to measure the position of each workpiece in the luminance image. The workpiece position may be defined by, for example, the coordinate values in the luminance image and the tilt of the workpiece in the luminance image. The obtained workpiece position in the luminance image is written into the measurement result 124 described above.

In step S14, the image sensor 100 defines an area in the range image corresponding to the position of each workpiece (or corresponding area) in the luminance image measured in step S12, and obtains the workpiece overlap order based on the height information included in the corresponding area. The workpiece overlap order is written into the measurement result 124.

In step S20, the image sensor 100 transmits the measurement result 124 to the PLC 200. The image sensor 100 repeats the processing in steps S10, S12, S14, and S20 and successively transmits the measurement result 124 to the PLC 200. The image sensor 100 excludes, from the measurement result 124, any workpiece that is redundant with the workpiece that has undergone the preceding measurement, among workpieces that have undergone the current measurement. The image sensor 100 then transmits the obtained measurement result 124 to the PLC 200.

In step S22, the PLC 200 refers to the measurement result 124 received from the image sensor 100 to determine the workpiece pickup order. The method for determining the workpiece pickup order is described above, and will not be described repeatedly.

In step S24, the PLC 200 enters the workpiece information into the queue 225 in accordance with the workpiece pickup order determined in step S22. The workpiece information to be entered includes, for example, workpiece identification information and the workpiece position. The workpiece position is defined by, for example, the coordinate values (x-coordinate, y-coordinate) in the luminance image or in the range image, the tilt 8 of the workpiece in the luminance image or in the range image, and the height h of the workpiece from the conveyor. The PLC 200 then periodically obtains the count from the counter 127, and sequentially updates the workpiece positions entered in the queue 225 in accordance with the obtained count. The tracking operation is performed in this manner.

At every reception of a new measurement result 124 from the image sensor 100, the PLC 200 repeats the processing in steps S22 and S24. This allows the pickup target workpieces to be successively entered in the queue 225.

When the time for picking up a workpiece has arrived in step S30, the PLC 200 retrieves, from the workpiece information entered in the queue 225, workpiece information entered earlier for the pickup target workpiece. The PLC 200 generates an operation instruction to pick up the target workpiece, and transmits the generated operation instruction to the robot 300.

In step S32, the robot 300 picks up the target workpiece in response to the operation instruction received from the PLC 200. In this process, the robot 300 sequentially obtains information about the position of a destination container, and carries the picked workpiece into the container in accordance with the obtained position information.

The PLC 200 repeats the processing in steps S30 and S32 every time when the workpiece pickup time arrives. Through this operation, the PLC 200 allows a workpiece entered earlier in the queue 225 to be picked up earlier.

G. Control Mechanism

Figure 9:
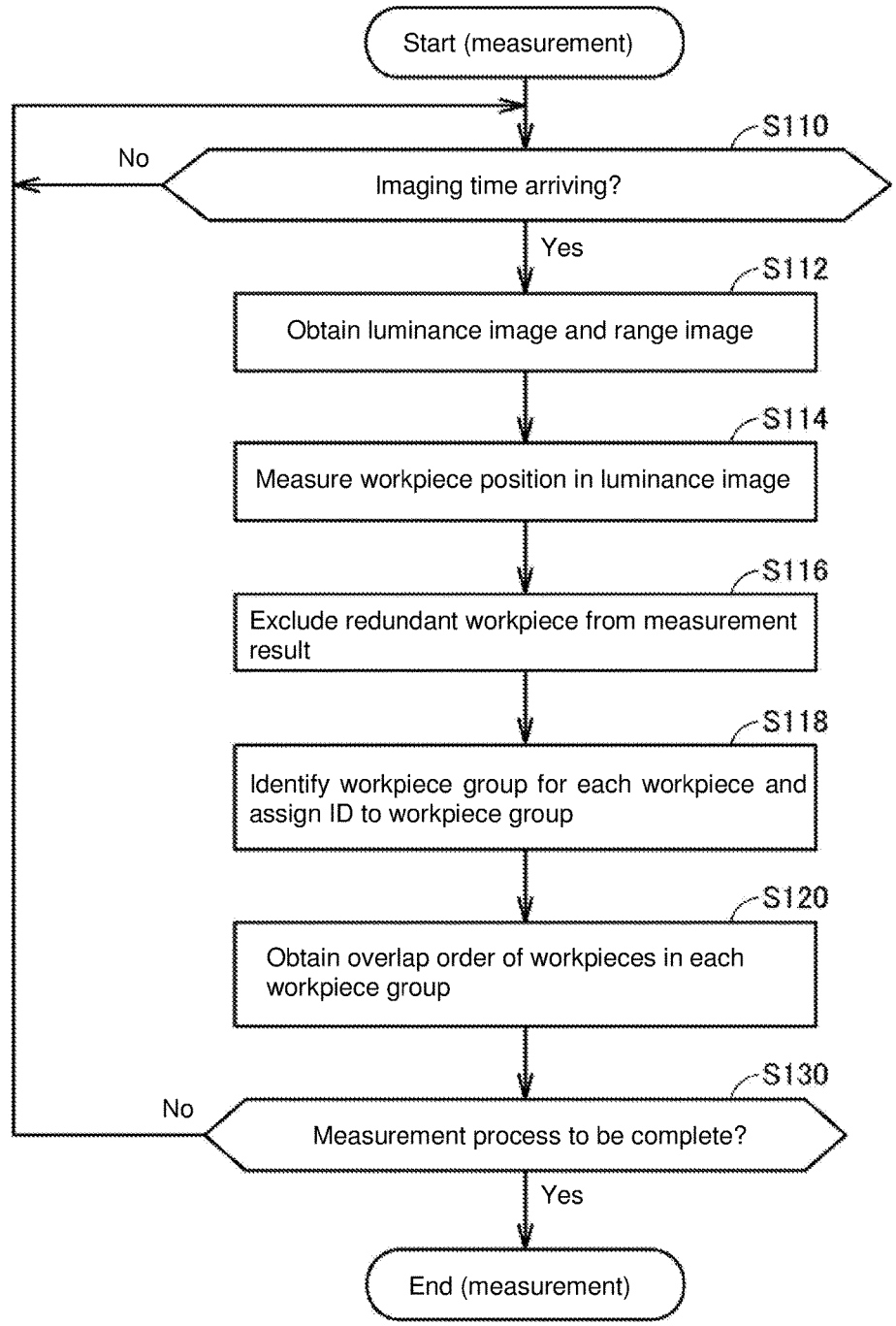
FIG. 9 is a flowchart illustrating a workpiece measurement process.
Figure 10:
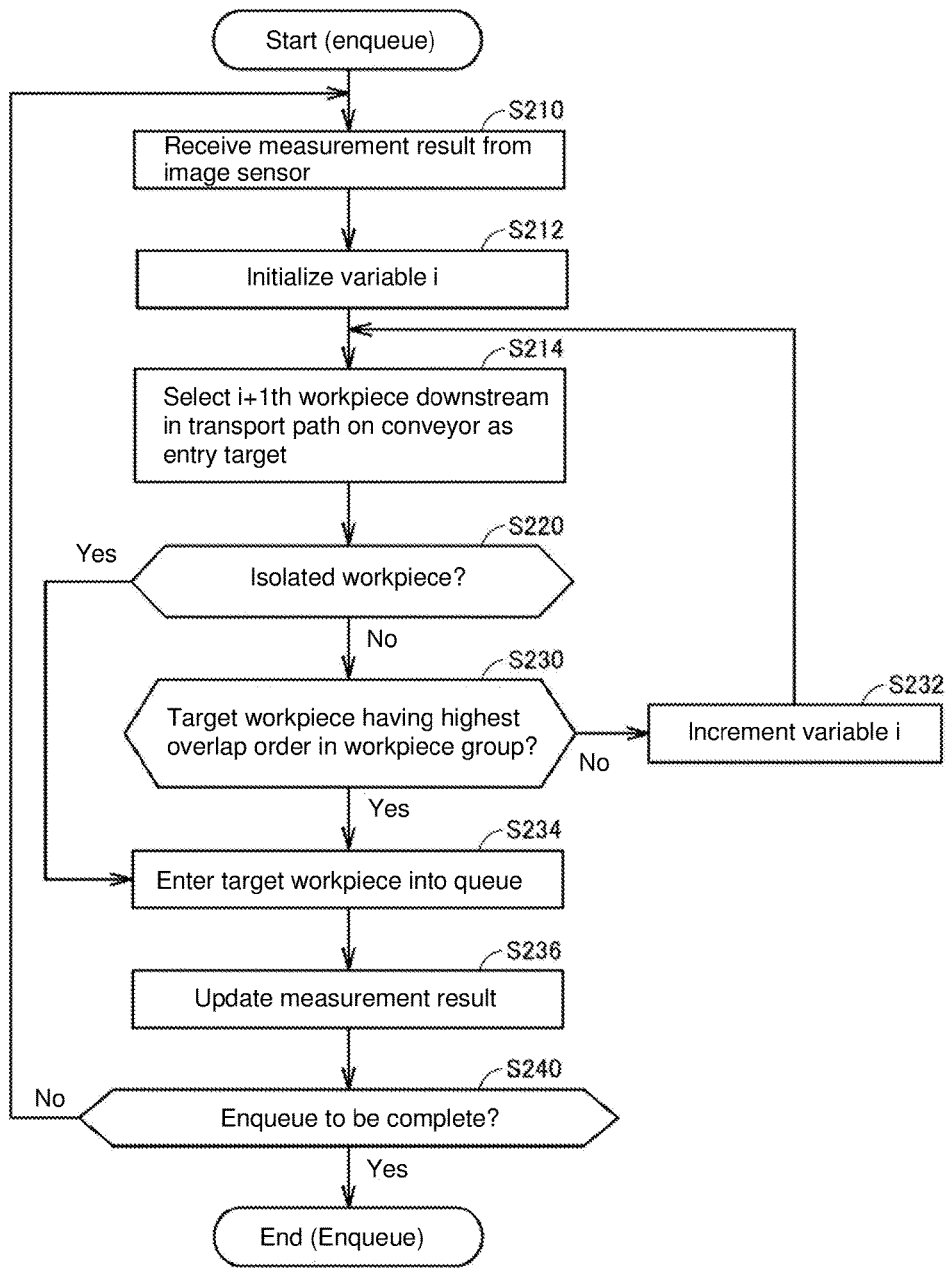
FIG. 10 is a flowchart illustrating an enqueue process for a pickup target workpiece.
Figure 11:
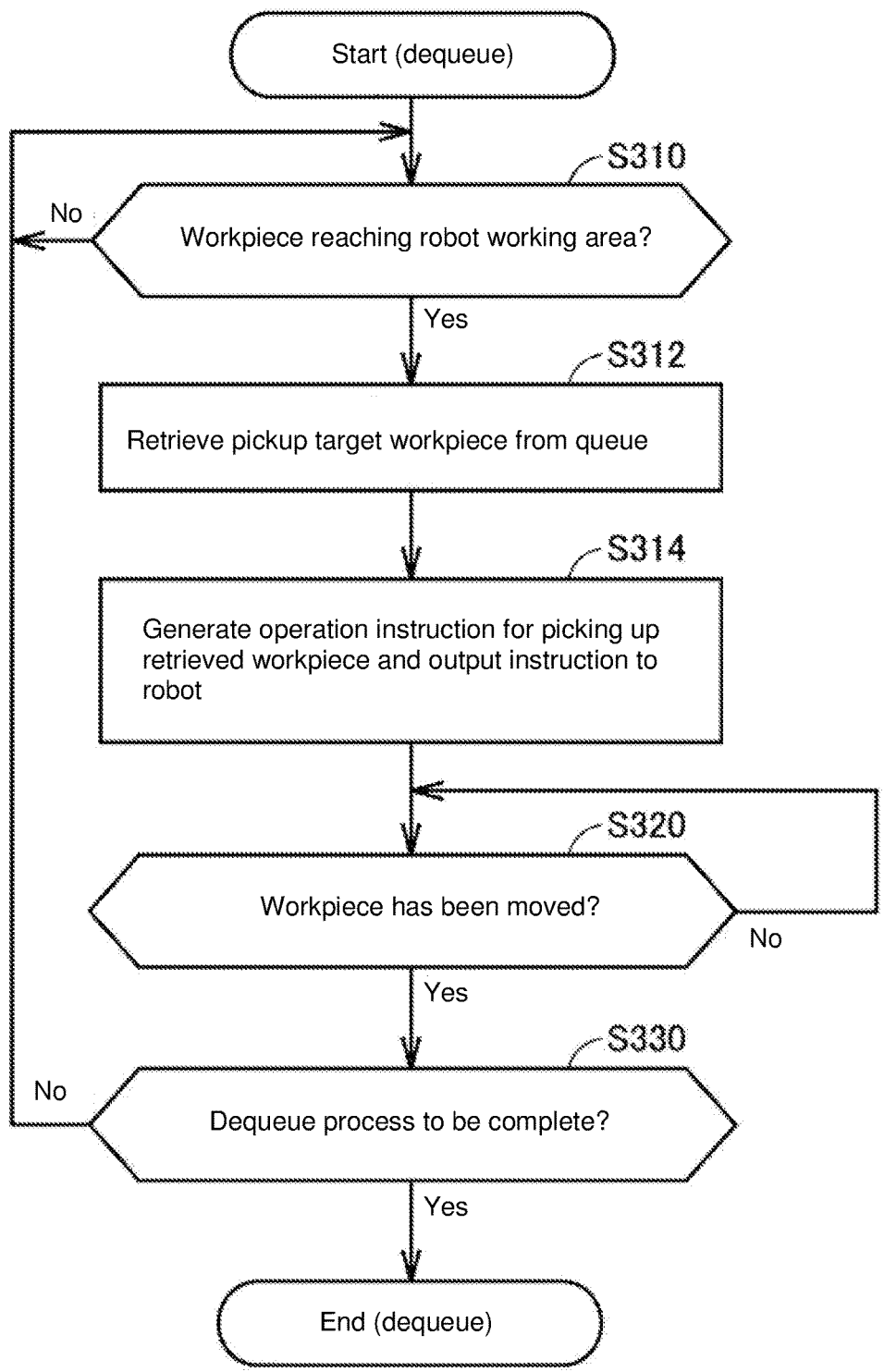
FIG. 11 is a flowchart illustrating a dequeue process for a pickup target workpiece.

Referring now to FIGS. 9 to 11, the control mechanism for the image processing system 1 will be described. FIG. 9 is a flowchart showing the workpiece measurement process. The process in FIG. 9 is performed by the controller 101 in the image sensor 100 executing a program. In another embodiment, the process may be partly or entirely performed by a circuit element or other hardware.

FIG. 10 is a flowchart showing an enqueue process for a pickup target workpiece. FIG. 11 is a flowchart showing a dequeue process for a pickup target workpiece. The processes shown in FIGS. 10 and 11 are performed by the controller 201 included in the PLC 200 executing programs. In another embodiment, the processes may be partly or entirely performed by a circuit element or other hardware.

The measurement process shown in FIG. 9, the enqueue process shown in FIG. 10, and the dequeue process shown in FIG. 11 will now be described in the stated order.

G1. Measurement Process

Referring to FIG. 9, the controller 101, or specifically the measurement unit 152 described above (refer to FIG. 4), determines whether the time for the imaging device 130 to perform imaging has arrived in step S110. In one example, the imaging time arrives at predetermined intervals. When determining that the time for the imaging device 130 to perform imaging has arrived (Yes in step S110), the controller 101 advances to step S112. Otherwise (No in step S110), the controller 101 repeats the processing in step S110.

In step S112, the controller 101, or specifically the measurement unit 152, outputs an imaging instruction to the imaging device 130, and obtains a luminance image representing the subject and a range image including height information indicating the height of each point on the subject from the conveyor.

In step S114, the controller 101, or specifically the measurement unit 152, performs predetermined image processing for measuring workpieces to measure the workpiece positions in the luminance image. The obtained workpiece positions in the luminance image are written into the measurement result 124 (refer to FIG. 4) described above.

In step S116, the controller 101 excludes, from the measurement result 124, the same workpiece as the workpiece that has undergone the preceding measurement, among workpieces that have undergone the current measurement. More specifically, the controller 101 calculates the moving distance of the workpiece corresponding to the time period between the preceding measurement and the current measurement. The moving distance is calculated based on, for example, the moving speed of the conveyor. The controller 101 transforms the moving distance in the real space into the distance in the image (hereafter also referred to as an intra-image distance). The controller 101 excludes, from the measurement result 124, a workpiece at a position advanced from the preceding measurement position by the intra-image distance in the moving direction of the workpiece among workpieces that have undergone the current measurement, assuming that the workpiece has undergone the preceding measurement.

In step S118, the controller 101, or specifically the obtaining unit 154 described above (refer to FIG. 4), assigns a workpiece group ID to each of the measured workpieces. More specifically, the controller 101 calculates, for each workpiece, the distance between the workpieces. The controller 101 assigns a workpiece group ID of 0 to a workpiece spaced apart from other workpieces by at least a predetermined distance. In other words, the workpiece having the workpiece group ID of 0 is determined as an isolated workpiece. The controller 101 identifies a group of workpieces each having a distance between workpieces smaller than the predetermined value as one group of workpieces. The controller 101 then assigns a workpiece group ID (e.g., a number selected from 1 to 999) to each group of workpieces. The workpiece group ID is incremented at every assignment of an ID to one group of workpieces. The assigned workpiece group ID is written into the measurement result 124.

In step S120, the controller 101, or specifically the obtaining unit 154, obtains the workpiece overlap order in each group of workpieces in step S118. More specifically, the controller 101 defines an area in the range image corresponding to the position of each workpiece (or corresponding area) in the luminance image measured in step S114. Based on the height information included in the corresponding area, the controller 101 obtains the workpiece overlap order in each group of workpieces. The obtained workpiece overlap order is written into the measurement result 124.

In step S130, the controller 101 determines whether the measurement process is to be complete. For example, the controller 101 determines that the measurement process is to be complete when the controller 101 receives an instruction for completing the measurement process from a user. When determining that the measurement process is to be complete (Yes in step S130), the controller 101 completes the process shown in FIG. 9. Otherwise (No in step S130), the controller 101 returns to step S110.

G2. Entering Workpiece

Referring now to FIG. 10, the enqueue process performed by the PLC 200 will be described.

In step S210, the controller 201 receives the measurement result 124 obtained through the measurement process described in FIG. 9 from the image sensor 100.

In step S212, the controller 201 initializes a variable i to, for example, 0.

In step S214, the controller 201 refers to the measurement result 124 to select an i+1th workpiece downstream in the transport path on the conveyor as an entry target workpiece to be entered into the queue 225.

In step S220, the controller 201 determines whether the entry target workpiece is an isolated workpiece. In this process, the controller 201 refers to the measurement result 124 and determines the entry target workpiece as an isolated workpiece when the workpiece group ID assigned to the target workpiece is 0. When determining that the entry target workpiece is an isolated workpiece (Yes in step S220), the controller 201 advances to step S234. Otherwise (No in step S220), the controller 201 advances to step S230.

In step S230, the controller 201 refers to the measurement result 124 to determine whether the entry target workpiece has the highest place in the overlap order in its group of workpieces. When determining that the entry target workpiece has the highest place in the overlap order in its group of workpieces (Yes in step S230), the controller 201 advances to step S234. Otherwise (No in step S230), the controller 201 advances to step S232.

In step S232, the controller 201 increments the variable, or specifically increases the variable i by 1.

In step S234, the controller 201, or specifically the determination unit 254 described above (refer to FIG. 4), enters the entry target workpiece into the queue 225.

In step S236, the controller 201 updates the measurement result 124. More specifically, the controller 201 deletes the workpiece entered in the queue 225 from the measurement result 124, and updates the overlap order of other workpieces included in the same group of workpieces as the group of the entry target workpiece. The controller 201 also deletes, from the measurement result 124, the workpiece that has passed through the working area AR2 (refer to FIG. 1) for the robot 300 among workpieces included in the measurement result 124.

In step S240, the controller 201 determines whether the enqueue process is to be complete. For example, the controller 201 determines that the enqueue process is to be complete when the controller 201 receives an instruction for completing the enqueue process from a user. When determining that the enqueue process is to be complete (Yes in step S240), the controller 201 completes the processing shown in FIG. 10. Otherwise (No in step S240), the controller 201 returns to step S210.

G3. Pickup of Workpieces

Referring now to FIG. 11, a dequeue process performed by the PLC 200 will be described.

In step S310, the controller 201, or specifically the robot control unit 258 described above (refer to FIG. 4), determines whether the workpiece transported on the conveyor 20A has reached the working area AR2 (refer to FIG. 1) for the robot 300. For example, the controller 201 tracks each workpiece. When a workpiece is included in a predetermined area corresponding to the working area AR2, the controller 201 determines that the workpiece has reached the working area. When determining that the workpiece transported on the conveyor 20A has reached the working area AR2 for the robot 300 (Yes in step S310), the controller 201 advances to step S312. Otherwise (No in step S310), the controller 201 repeats the processing in step S310.

In step S312, the controller 201, or specifically the robot control unit 258, retrieves a pickup target workpiece from the queue 225. In this process, the controller 201 retrieves a workpiece entered earlier from the queue 225.

In step S314, the controller 201, or specifically the robot control unit 258 generates an operation instruction for picking up the workpiece retrieved from the queue 225 in step S312, and outputs the generated operation instruction to the robot 300.

In step S320, the controller 201 determines whether the robot 300 has completely moved the workpiece. For example, the controller 201 determines that the workpiece has been moved when the controller 201 receives a signal indicating the completion of the workpiece placement from the robot 300. When determining that the robot 300 has completely moved the workpiece (Yes in step S320), the controller 201 advances to step S330. Otherwise (No in step S320), the controller 201 repeats the processing in step S320.

In step S330, the controller 201 determines whether the dequeue process is to be complete. In one example, the controller 201 determines that the dequeue process is to be complete when the controller 201 receives an instruction for completing the dequeue process by a user. When determining that the dequeue process is to be complete (Yes in step S330), the controller 201 completes the processing shown in FIG. 11. Otherwise (No in step S330), the controller 201 returns to step S310.

H. Hardware Configuration of Image Sensor 100

Figure 12:
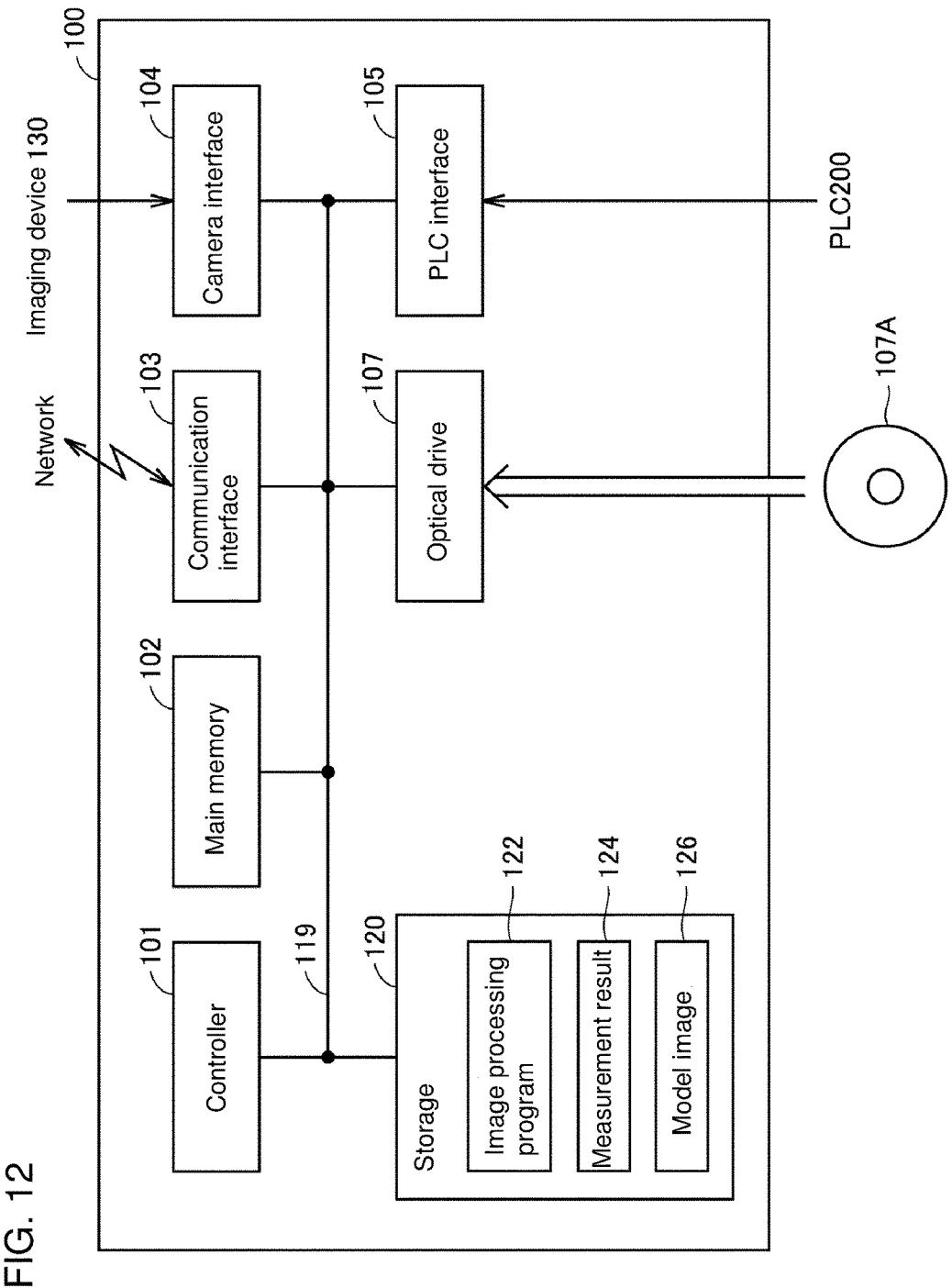
FIG. 12 is a schematic block diagram illustrating the hardware configuration of an image sensor according to a first embodiment.

Referring now to FIG. 12, the hardware configuration of the image sensor 100 according to an embodiment will be described. FIG. 12 is a schematic block diagram showing the hardware configuration of the image sensor 100 according to an embodiment.

The image sensor 100 is, for example, a computer with a general-purpose computer architecture. The image sensor 100 includes the controller 101, a main memory 102, a communication interface 103, a camera interface 104, a PLC interface 105, an optical drive 107, and the storage 120 (memory unit). These components are connected to one another with an internal bus 119 to allow communication between them.

The controller 101 includes, for example, at least one integrated circuit. The integrated circuit includes, for example, at least one central processing unit (CPU), at least one application specific integrated circuit (ASIC), at least one field programmable gate array (FPGA), or their combinations. The controller 101 expands an image processing program 122 stored in the storage 120 into the main memory 102, and executes the program to perform various types of processing according to an embodiment. The main memory 102, which is a volatile memory, serves as a work memory used by the controller 101 to execute the programs.

The communication interface 103 allows data communication with external devices through a network. The external devices includes, for example, the counter 127 described above (refer to FIG. 1), the imaging device 130 described above (refer to FIG. 1), the PLC 200 described above (refer to FIG. 1), a server, or other communication devices. The image sensor 100 may also download the image processing program 122 according to an embodiment through the communication interface 103.

The camera interface 104 is connected to the imaging device 130 described above. The camera interface 104 receives an image signal obtained through an imaging operation performed by the imaging device 130, and transmits an instruction such as the imaging time to the imaging device 130. The imaging device 130 includes, for example, an imaging element such as a charge-coupled device (CCD) sensor or a complementary metal oxide semiconductor (CMOS) sensor, which has multiple pixels, in addition to optical systems such as a lens.

The PLC interface 105 is connected to the PLC 200. The image sensor 100 transmits the measurement results for the workpieces or other data to the PLC 200 through the PLC interface 105.

The optical drive 107 reads various programs from, for example, an optical disc 107A, and installs the programs into the storage 120. The storage 120 stores, for example, the image processing program 122.

Although FIG. 12 shows the example configuration in which the programs to be used are installed into the image sensor 100 through the optical drive 107, another configuration may be used. The programs may be downloaded from a server on a network. The programs installed in the image sensor 100 may also be rewritten using a program written in a storage medium such as a universal serial bus (USB) memory, a secure digital (SD) card, or a compact flash (CF) card.

The storage 120 is, for example, a hard disk drive or an external storage medium. In one example, the storage 120 stores the image processing program 122 for performing various types of processing according to an embodiment, the measurement result 124 described above (refer to FIG. 4), and the model image 126 used as a reference for the workpiece to be measured.

The image processing program 122 may not be an independent program, but may be incorporated into a part of another program. In this case, the program works with the other program to perform the processing according to an embodiment. Such a program without including some modules does not depart from the scope of the image sensor 100 according to an embodiment. All or some of the functions provided by the image processing program 122 according to an embodiment may also be implemented using dedicated hardware. Further, at least two of the image sensor 100, the PLC 200, and the robot 300 may operate in cooperation with each other to perform the processing according to an embodiment. The image sensor 100 may also operate in the form of a cloud service, in which at least one server performs the processing according to an embodiment.

I. Hardware Configuration of PLC 200

Figure 13:
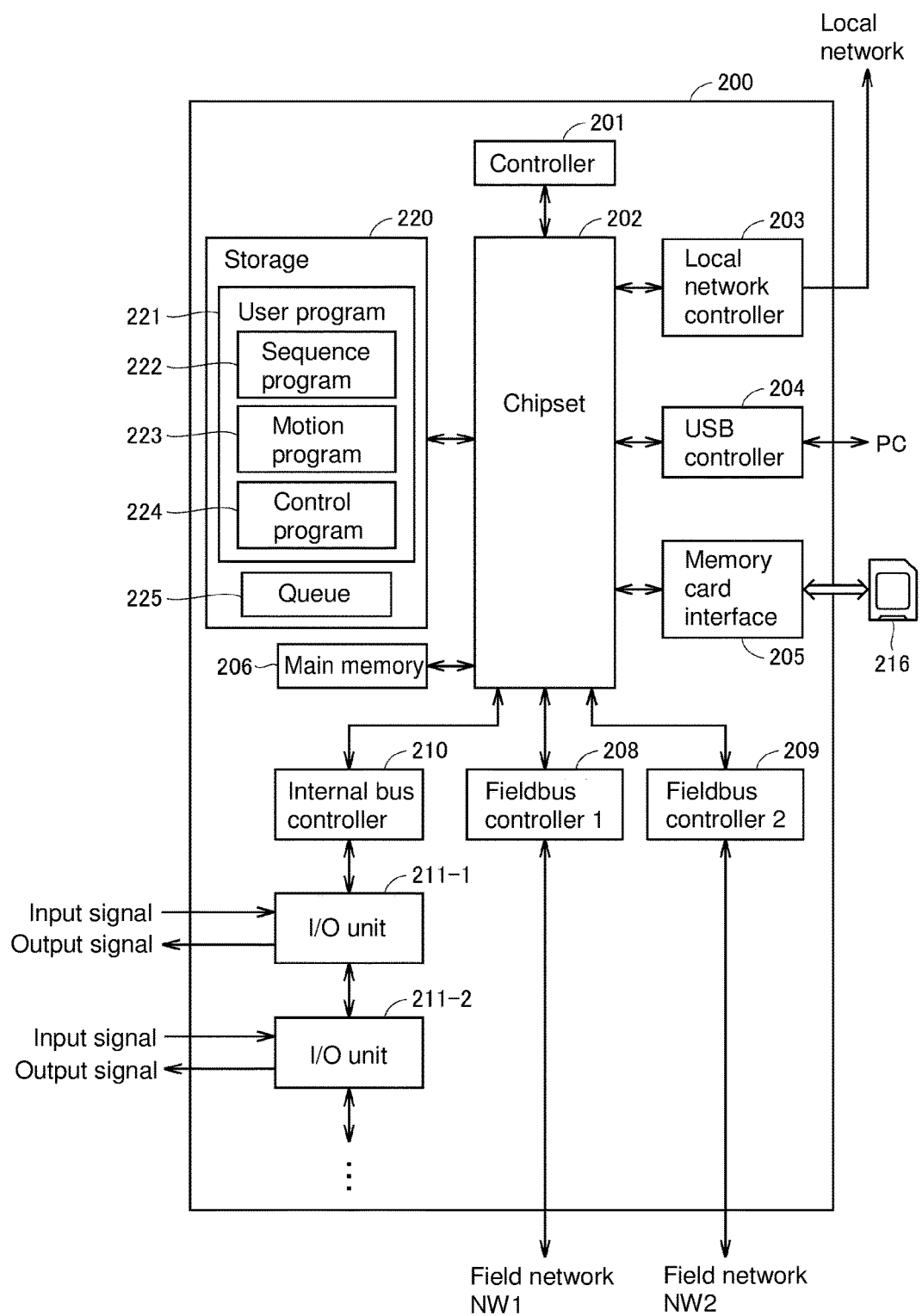
FIG. 13 is a block diagram illustrating an example hardware configuration of a PLC according to a first embodiment.

Referring now to FIG. 13, the hardware configuration of the PLC 200 according to an embodiment will be described. FIG. 13 is a block diagram showing an example hardware configuration of the PLC 200 according to an embodiment.

The PLC 200 includes the controller 201, such as a central processing unit (CPU) or a micro-processing unit (MPU), a chipset 202, a main memory 206, the storage 220, a local network controller 203, a universal serial bus (USB) controller 204, a memory card interface 205, an internal bus controller 210, fieldbus controllers 208 and 209, and I/O units 211-1, 211-2, and subsequent I/O units.

The controller 201 reads various programs stored in the storage 220, and expands the programs in the main memory 206 and executes the programs to implement control for the control target and the processing according to an embodiment. The chipset 202 controls the controller 201 and each component to implement the overall processing performed by the PLC 200.

The storage 220 is, for example, a secondary storage. The storage 220 stores system programs for implementing a PLC engine, as well as user programs 221 executed using the PLC engine, the queue 225 described above (refer to FIG. 4), and other data. The user programs 221 include, for example, a sequence program 222 mainly responsible for logical computations, a motion program 223 mainly responsible for numerical computations such as positional control or speed control, and a control program 224 mainly responsible for computations for implementing the processing according to an embodiment.

The local network controller 203 controls data communication with another device (e.g., a server) through a local network. The USB controller 204 controls data communication with another device (e.g., a personal computer, or a PC) through USB connection.

The memory card interface 205 can receive a removable memory card 216. The memory card interface 205 allows data to be written into the memory card 216, and various data (e.g., user programs and trace data) to be read from the memory card 216.

The internal bus controller 210 is an interface that allows data communication with the I/O units 211-1, 211-2, and other I/O units incorporated in the PLC 200.

The fieldbus controller 208 controls data communication with another device (e.g., the image sensor 100 and the counter 127) through the field network NW1. Similarly, the fieldbus controller 209 controls data communication with another device (e.g., the robot 300) through the field network NW2.

Although FIG. 13 shows the configuration in which program execution by the controller 201 provides each intended function, some or all of these functions may also be implemented using dedicated hardware circuits (e.g., ASICs or FPGAs). In some embodiments, the main part of the PLC 200 may be implemented with hardware having a general-purpose architecture (e.g., an industrial personal computer based on a general-purpose personal computer). In that case, multiple operating systems (OSes) for different uses may be executed in parallel using a virtualization technique, and an intended application may be executed on each OS.

J. Summary of First Embodiment

As described above, the image sensor 100 according to an embodiment obtains a luminance image representing a subject and a range image including height information indicating the height of each point on the subject from the transportation surface on the conveyor 20A. The image sensor 100 performs predetermined image processing for measuring workpieces to measure the workpiece positions in the luminance image. The image sensor 100 then defines an area in the range image corresponding to the position of each workpiece (or corresponding area) in the luminance image, and obtains the workpiece overlap order based on the height information included in the corresponding area. The image sensor 100 determines the workpiece pickup order for each workpiece to allow a workpiece having a higher place in the overlap order to be picked up earlier.

This allows the robot 300 to pick up a workpiece at a higher location earlier. The robot 300 picks up workpieces sequentially from upper workpieces, and thus can pick up these workpieces without interference between them. The image sensor 100 does not redetermine the position of each workpiece. This allows efficient pickup of workpieces.

Second Embodiment

A. Overview

The image processing system 1 according to a first embodiment picks up the workpieces in the determined workpiece pickup order and places the workpieces in the containers. Unlike this, an image processing system 1 according to a second embodiment picks up workpieces in the determined workpiece pickup order and aligns the workpieces on a conveyor.

The other features of the image processing system 1 according to a second embodiment are the same as the corresponding features in the image processing system 1 in a first embodiment, and will not be described repeatedly.

B. Image Processing System 1

Figure 14:
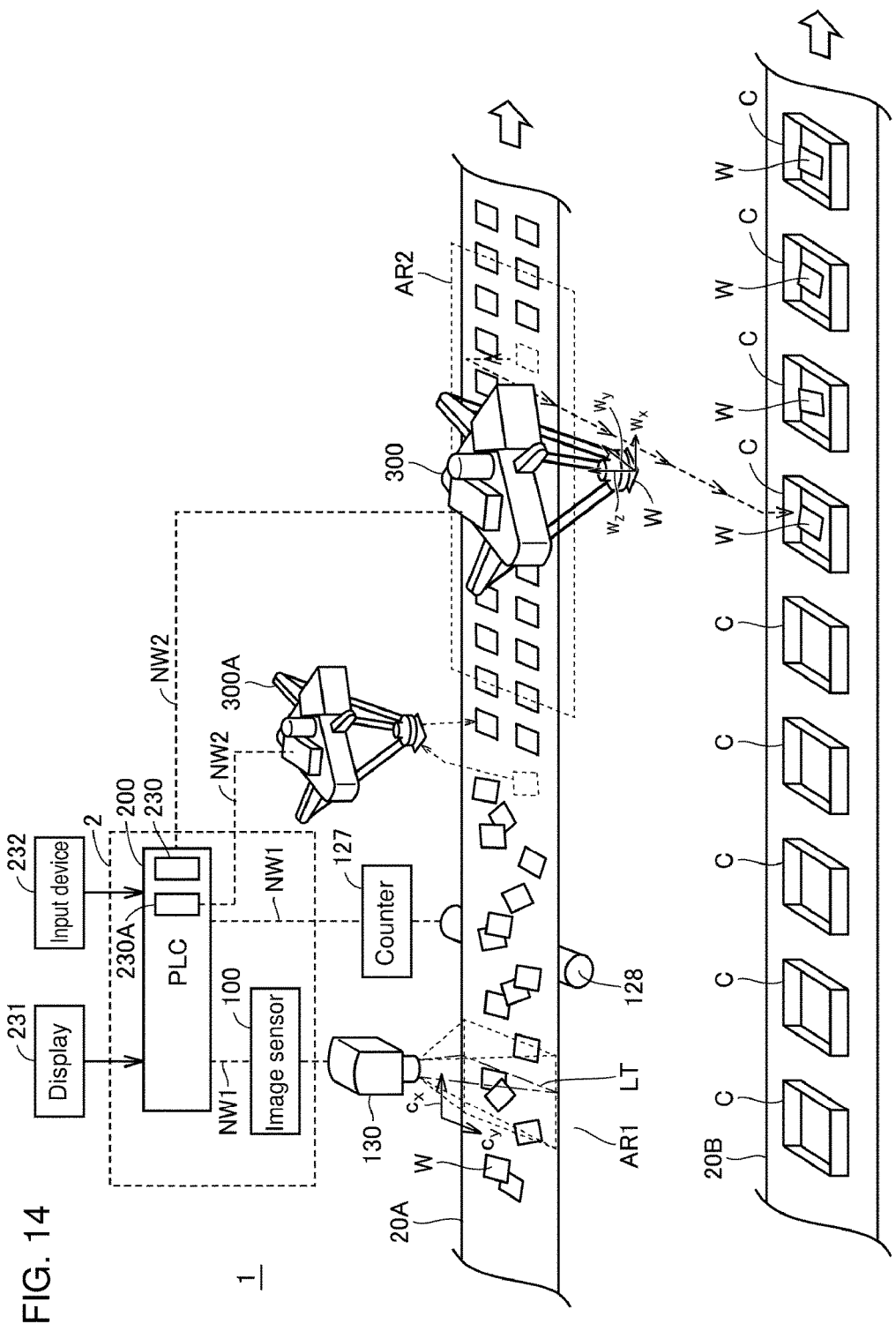
FIG. 14 a schematic diagram illustrating the basic structure of an image processing system according to a second embodiment.

Referring now to FIG. 14, the basic structure of the image processing system 1 according to a second embodiment will be described. FIG. 14 is a schematic diagram showing the basic structure of the image processing system 1 according to a second embodiment.

As shown in FIG. 14, the image processing system 1 according to an embodiment further includes a robot 300A, in addition to the robot 300. The PLC 200 thus further includes a servo driver 230A for controlling the robot 300A, in addition to the servo driver 230 for controlling the robot 300.

The robot 300A picks up workpieces W in the workpiece pickup order determined by the PLC 200, and aligns the workpieces W without overlaps on the conveyor 20A. A method for determining the workpiece pickup order for the workpieces W is the same as the method described above, and will not be described repeatedly.

The subsequent robot 300 moves the aligned workpieces W into containers B. The workpieces W have been aligned without overlaps by the preceding robot 300A. The subsequent robot 300 can thus pick up any workpiece in any pickup order.

Although the robot 300 picks up one workpiece after another in FIG. 14, the robot 300 may pick up multiple workpieces W at a time. In this case, the robot 300 can easily pick up multiple workpieces W after aligned without any overlaps by the preceding robot 300A. This allows different types of workpieces (e.g., dried ingredients) to be carried into a container B at a time, and greatly improves the efficiency of the pick-and-place operation of workpieces.

C. Summary of Second Embodiment

In an embodiment described above, the preceding robot 300A aligns the workpieces W on the conveyor 20A in the determined workpiece pickup order, and the subsequent robot 300 carries the aligned workpieces W into containers. The workpieces W have been aligned without overlaps by the preceding robot 300A, and thus the subsequent robot 300 can carry any workpiece W into the container B in any order.

Third Embodiment

A. Overview

The imaging device 130 according to a first embodiment includes the single projector and the single photoreceiver (refer to FIG. 2). Unlike this, an imaging device 130 according to a third embodiment includes a single projector and two photoreceivers.

The other features of the image processing system 1 according to a third embodiment are the same as the corresponing features of the image processing system 1 in a first embodiment, and will not be described repeatedly.

B. Image Processing System 1

Figure 15:
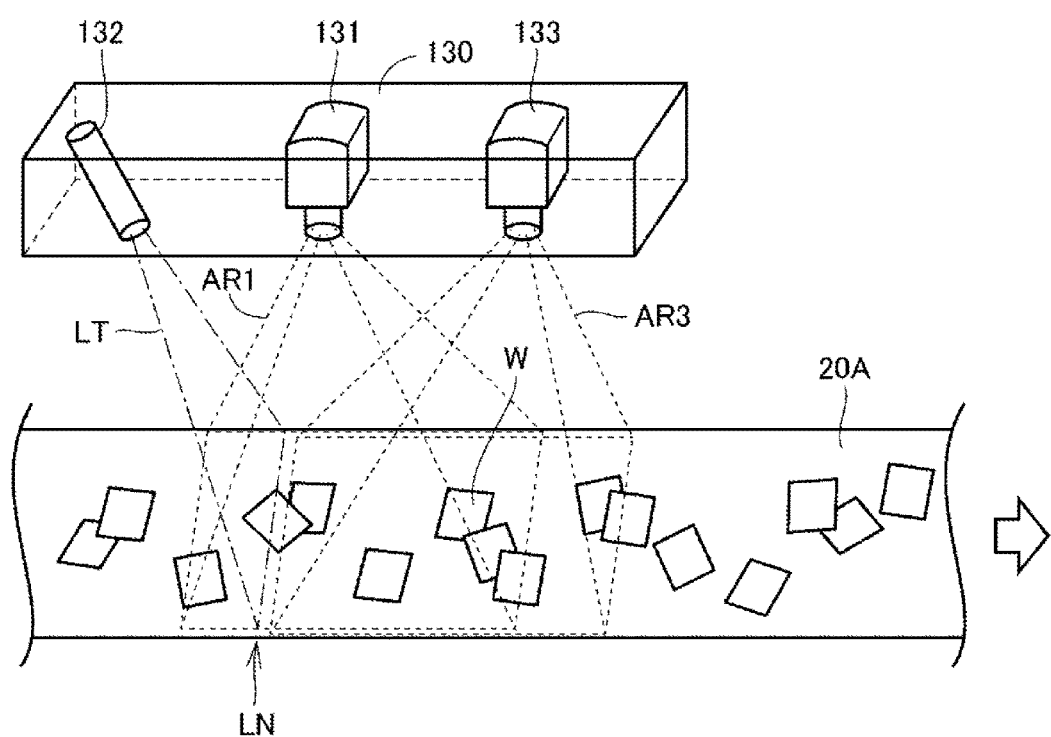
FIG. 15 is a diagram illustrating an imaging device according to a third embodiment.

Referring now to FIG. 15, the imaging device 130 according to a third embodiment will be described. FIG. 15 is a diagram showing the imaging device 130 in one embodiment. In FIG. 15, workpieces W transported on the conveyor 20A are being imaged by the imaging device 130.

The imaging device 130 includes photoreceivers 131 and 133, and a projector 132. The photoreceiver 131 and the projector 132 generate a range image. The range image is generated by the light-section method. More specifically, the projector 132 projects, onto the workpiece W, linear light LT that diverges in a direction orthogonal to the transportation direction of the workpiece W. The photoreceiver 131 (a first photoreceiver) successively receives reflected light of the linear light LT from the workpiece W, and generates a range image based on the position of the received reflected light upon every reception of light.

The photoreceiver 131 typically includes a plurality of photoreceiving elements arranged in two dimensions. The reflected light of the light LT enters different photoreceiving elements depending on the distance between the imaging device 130 and the subject. More specifically, the photoreceiver 131 can obtain a profile along the line LN by imaging the reflected light of the linear LT from the subject. The profile undergoes triangulation to produce sets of height information each indicating the height of a point on the subject on the line LN from the transportation surface on the conveyor 20A. The imaging device 130 arranges the obtained sets of height information chronologically to generate a range image.

In contrast, the photoreceiver 133 (a second photo receiver) receives reflected natural light from the subject included in the imaging field of view AR3 to generate a luminance image representing the subject. The range image and the luminance image are captured from different viewpoints and thus the subject in the range image and the subject in the luminance image appear at different positions between these images. The image sensor 100 thus aligns the range image and the luminance image with each other. The deviation between the subject in the range image and the subject in the luminance image is determined when the positional relationship between the photoreceivers 131 and 133 is defined. The image sensor 100 thus aligns the two images based on the predefined positional relationship between the photoreceivers 131 and 133. The image sensor 100 then defines an area in the range image corresponding to the position of each workpiece (or corresponding area) in the luminance image, and obtains the workpiece overlap order based on the height information included in the corresponding area.

C. Summary of Third Embodiment

As described above, the image processing system 1 according to an embodiment includes the photoreceiver 131 and the projector 132 for generating the range image and the photoreceiver 133 for generating the luminance image. This structure allows the photoreceiver 133 to generate the luminance image without being affected by the projector 132, and thus improves the accuracy of workpiece measurement. The image sensor 100 can obtain the workpiece overlap order in an accurate manner.

The embodiments disclosed herein should be considered to be in all respects illustrative and not restrictive. The scope of the invention is not defined by the embodiments described above but is defined by the appended claims, and all changes that come within the meaning and range of equivalency of the claims are intended to fall within the claims.

REFERENCE SIGNS LIST 1 image processing system
2 image processing apparatus 20A conveyor
30A, 30B workpiece group
40 luminance image
41A to 41C, 51A to 51C, 72A, 72B workpiece area
50, 80 range image
73A, 73B, 83A, 83B center
82A, 82B corresponding area
100 image sensor
101, 201 controller
102, 206 main memory
103 communication interface
104 camera interface
105 PLC interface
107 optical drive
107A optical disc
119 internal bus
120, 220 storage
122 image processing program
124 measurement result
126 model image
127 counter
128 encoder
130 imaging device
131, 133 photoreceiver
132 projector
152 measurement unit
154 obtaining unit
202 chipset
203 local network controller
204 controller
205 memory card interface
208, 209 fieldbus controller
210 internal bus controller
211 I/O unit
216 memory card
221 user program
222 sequence program
223 motion program
224 control program
225 queue
230, 230A servo driver
231 display
232 input device
252 reception unit
254 determination unit
256 update unit
258 robot control unit

The invention claimed is:

1. An image processing system for determining a workpiece pickup order in which overlapping workpieces being transported on a conveyor are picked up by a robot, the system comprising:
an imaging unit comprising a projector and arranged to have an imaging field of view containing the conveyor, and configured to:
image a subject comprising a plurality of the overlapping workpieces included in the imaging field of view; and
generate, based on linear light projected from the projector and reflected from the subject and natural light reflected from the subject, a luminance image representing the subject and a range image comprising height information indicating a height of at least one point on the subject; and
a processor configured with a program to perform operations comprising:
operation as a measurement unit configured to measure a position of each of the plurality of workpieces in the subject, based on the luminance image;
operation as an obtaining unit configured to obtain an overlap order in which the plurality of workpieces overlap one another based on the height information in the range image corresponding to the position of each of the plurality of workpieces in the luminance image; and
operation as a determination unit configured to:
determine the workpiece pickup order for the plurality of workpieces such that a workpiece having a highest place in the overlap order is picked up with a higher priority than other workpieces; and
determine, in response to the luminance image comprising at least one workpiece that does not overlap another workpiece and a plurality of overlapping workpieces, the workpiece pickup order for the at least one workpiece that does not overlap another workpiece and a workpiece having a highest place in the overlap order among the plurality of overlapping workpieces such that a workpiece more downstream in a transport path on the conveyor is picked up with a higher priority than other workpieces.

2. The image processing system according to claim 1, wherein
the projector is configured to project, onto the plurality of workpieces transported on the conveyor, the linear light such that the linear light diverges in a direction orthogonal to a transportation direction of the plurality of workpieces, and
the imaging unit comprises a photoreceiver configured to successively receive the reflected linear light from the plurality of workpieces transported on the conveyor to generate the range image based on a position of the received reflected light upon every reception of light, and receive reflected light from the subject included in the imaging field of view to generate the luminance image.

3. The image processing system according to claim 1, wherein
the projector is configured to project, onto the plurality of workpieces transported on the conveyor, the linear light such that the linear light diverges in a direction orthogonal to a transportation direction of the plurality of workpieces, and
the imaging unit comprises:
a first photoreceiver configured to successively receive the reflected linear light from the plurality of workpieces transported on the conveyor to generate the range image based on a position of the received reflected light upon every reception of light; and
a second photoreceiver configured to receive the natural light reflected from the subject included in the imaging field of view to generate the luminance image.

4. The image processing system according to claim 1, wherein the processor is configured with the program such that operation as the determination unit comprises operation as the determination unit that determines the workpiece pickup order for such that a workpiece having a higher place in the overlap order is picked up earlier than a workpiece having a lower place in the overlap order.

5. The image processing system according to claim 4, wherein
the projector is configured to project, onto the plurality of workpieces transported on the conveyor, the linear light such that the linear light diverges in a direction orthogonal to a transportation direction of the plurality of workpieces, and the imaging unit comprises a photoreceiver configured to successively receive the reflected linear light from the plurality of workpieces transported on the conveyor to generate the range image based on a position of the received reflected light upon every reception of light, and receive reflected light from the subject included in the imaging field of view to generate the luminance image.

6. The image processing system according to claim 4, wherein the processor is configured with the program such that:

operation as the obtaining unit comprises operation as the obtaining unit that, in response to the luminance image comprising a plurality of workpiece groups, each of the plurality of workpiece groups comprising a plurality of overlapping workpieces, obtains the overlap order for each workpiece group; and operation as the determination unit comprises operation as the determination unit that determines the workpiece pickup order for a workpiece having a highest place in the overlap order in each workpiece group such that a workpiece more downstream in a transport path on the conveyor is picked up with a higher priority than other workpieces.

7. The image processing system according to claim 6, wherein the projector is configured to project, onto the plurality of workpieces transported on the conveyor, the linear light such that the linear light diverges in a direction orthogonal to a transportation direction of the plurality of workpieces, and the imaging unit comprises a photoreceiver configured to successively receive the reflected linear light from the plurality of workpieces transported on the conveyor to generate the range image based on a position of the received reflected light upon every reception of light, and receive reflected light from the subject included in the imaging field of view to generate the luminance image.

8. The image processing system according to claim 1, wherein the processor is configured with the program to perform operations such that:

operation as the obtaining unit comprises operation as the obtaining unit that, in response to the luminance image comprising a plurality of workpiece groups, each of the plurality of workpiece groups comprising a plurality of overlapping workpieces, obtains the overlap order for each workpiece group; and operation as the determination unit comprises operation as the determination unit that determines the workpiece pickup order for a workpiece having a highest place in the overlap order in each workpiece group such that a workpiece more downstream in a transport path on the conveyor is picked up with a higher priority than other workpieces.

9. The image processing system according to claim 3, wherein the projector is configured to project, onto the plurality of workpieces transported on the conveyor, the linear light such that the linear light diverges in a direction orthogonal to a transportation direction of the plurality of workpieces, and the imaging unit comprises a photoreceiver configured to successively receive the reflected light of the linear light from the plurality of workpieces transported on the conveyor to generate the range image based on a position of the received reflected light upon every reception of light, and receive reflected light from the subject included in the imaging field of view to generate the luminance image.

10. An image processing apparatus for determining a workpiece pickup order in which overlapping workpieces being transported on a conveyor are picked up by a robot, the apparatus comprising:

an imaging unit comprising a projector and arranged to have an imaging field of view containing the conveyor, and configured to:

image a subject comprising a plurality of the overlapping workpieces and included in the imaging field of view; and generate, based on linear light projected from the projector and reflected from the subject and natural light reflected from the subject, a luminance image representing the subject and a range image comprising height information indicating a height of at least one point on the subject; and a processor configured with a program to perform operations comprising:

operation as a measurement unit configured to measure a position of each of the plurality of workpieces in the subject, based on the luminance image;

operation as an obtaining unit configured to obtain an overlap order in which the plurality of workpieces overlap one another based on the height information in the range image corresponding to the position of each of the plurality of workpieces in the luminance image; and operation as a determination unit configured to:

determine the workpiece pickup order for the plurality of workpieces such that a workpiece having a highest place in the overlap order is picked up with a higher priority than other workpieces; and determine, in response to the luminance image comprising at least one workpiece that does not overlap another workpiece and a plurality of overlapping workpieces, the workpiece pickup order for the at least one workpiece that does not overlap another workpiece and a workpiece having a highest place in the overlap order among the plurality of overlapping workpieces such that a workpiece more downstream in a transport path on the conveyor is picked up with a higher priority than other workpieces.

11. A pickup method for determining a workpiece pickup order in which overlapping workpieces being transported on a conveyor are picked up by a robot, the method comprising:

imaging a subject comprising a plurality of the overlapping workpieces included in an imaging field of view using an imaging unit comprising a projector and arranged to have the imaging field of view containing the conveyor by generating, based on linear light projected from the projector and reflected from the subject and natural light reflected from the subject, a luminance image representing the subject and a range image comprising height information indicating a height of at least one point on the subject from the conveyor by imaging the subject;

measuring a position of each of the plurality of workpieces in the subject, based on the luminance image;

obtaining an overlap order in which the plurality of workpieces overlap one another based on the height information in the range image corresponding to the position of each of the plurality of workpieces in the luminance image;

determining the workpiece pickup order for the plurality of workpieces such that a workpiece having a highest place in the overlap order is picked up with a higher priority than other workpieces; and determining, in response to the luminance image comprising at least one workpiece that does not overlap another workpiece and a plurality of overlapping workpieces, the workpiece pickup order for the at least one workpiece that does not overlap another workpiece and a workpiece having a highest place in the overlap order among the plurality of overlapping workpieces such that a workpiece more downstream in a transport path on the conveyor is picked up with a higher priority than other workpieces.

12. A non-transitory computer-readable recording medium storing a pickup program for determining a workpiece pickup order in which overlapping workpieces being transported on a conveyor are picked up by a robot, the program causing a computer to perform operations comprising:

imaging a subject comprising a plurality of overlapping workpieces included in an imaging field of view using an imaging unit comprising a projector and arranged to have the imaging field of view containing the conveyor by generating, based on linear light projected from the projector and reflected from the subject and natural light reflected from the subject, a luminance image representing the subject and a range image comprising height information indicating a height of at least one point on the subject from the conveyor by imaging the subject;

measuring a position of each of the plurality of workpieces in the subject, based on the luminance image;

obtaining an overlap order in which the plurality of workpieces overlap one another based on the height information in the range image corresponding to the position of each of the plurality of workpieces in the luminance image;

determining the workpiece pickup order for the plurality of workpieces such that a workpiece having a highest place in the overlap order is picked up with a higher priority than other workpieces; and determining, in response to the luminance image comprising at least one workpiece that does not overlap another workpiece and a plurality of overlapping workpieces, the workpiece pickup order for the at least one workpiece that does not overlap another workpiece and a workpiece having a highest place in the overlap order among the plurality of overlapping workpieces such that a workpiece more downstream in a transport path on the conveyor is picked up with a higher priority than other workpieces.

* * * * *